(12) United States Patent
Zhan et al.

(10) Patent No.: US 11,733,421 B2
(45) Date of Patent: Aug. 22, 2023

(54) METHOD FOR OBTAINING NEAR-WELLBORE TRUE BOREHOLE SIGMA AND TRUE FORMATION SIGMA BY USING A NUCLEAR LOGGING TOOL DURING OIL AND GAS EXPLORATION

(71) Applicant: China Petroleum & Chemical Corporation, Beijing (CN)

(72) Inventors: Sheng Zhan, Houston, TX (US); Jeremy Zhang, Houston, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 128 days.

(21) Appl. No.: 17/462,485

(22) Filed: Aug. 31, 2021

(65) Prior Publication Data

US 2023/0075550 A1  Mar. 9, 2023

(51) Int. Cl.
*G01V 5/10* (2006.01)
*E21B 49/08* (2006.01)

(52) U.S. Cl.
CPC .............. *G01V 5/105* (2013.01); *E21B 49/08* (2013.01)

(58) Field of Classification Search
CPC ................................ G01V 5/105; E21B 49/08
See application file for complete search history.

(56) References Cited

U.S. PATENT DOCUMENTS

| 4,137,450 A | 1/1979 | Hopkinson |
| 4,409,481 A | 10/1983 | Smith, Jr. |
| 4,760,252 A | 7/1988 | Albats |
| 4,814,610 A | 3/1989 | Attali |
| 5,536,938 A | 7/1996 | Mills et al. |
| 7,148,471 B2 | 12/2006 | Roscoe |
| 7,294,829 B2 | 11/2007 | Gilchrist |
| 7,365,307 B2 | 4/2008 | Stoller |
| 7,642,507 B2 | 1/2010 | Radtke |
| 8,050,866 B2 | 11/2011 | Jacobson |
| 8,558,165 B2 | 10/2013 | Evans |
| 8,598,510 B2 | 12/2013 | Zhang |
| 8,642,944 B2 | 2/2014 | Saenger |
| 8,849,573 B2 | 9/2014 | Zhang |

(Continued)

FOREIGN PATENT DOCUMENTS

| EP | 0436990 B1 | 7/1991 |
| GB | 2399880 A | 9/2004 |

OTHER PUBLICATIONS

Kang Yang, Peter R. Menge; Scintillation Properties and Temperature Responses of Cs2LiLaBr6:Ce3+; 978-1-4799-0534-8/13; 2013; IEEE; p. 1-6.

(Continued)

*Primary Examiner* — Mark R Gaworecki
(74) *Attorney, Agent, or Firm* — NKL Law; Allen Xue

(57) ABSTRACT

A method for wireline or logging-while-drilling systems that uses pulsed neutron sources coupled to multiple dual-function radiation detectors of neutrons and gamma rays, as well as a non-transitory computer readable memory device that can distinguish using pulse shape discrimination techniques the neutrons from the gamma rays in order to measure thermal neutron time-decay signals and thermal neutron capture gamma ray time-decay signals that are later further process using the non-transitory computer readable memory device to obtain a borehole sigma and formation sigma that are not affected by near-wellbore environments.

21 Claims, 11 Drawing Sheets

(56) References Cited

U.S. PATENT DOCUMENTS

| | | |
|---|---|---|
| RE45,226 E | 11/2014 | Odom |
| 9,341,737 B2 | 5/2016 | Inanc |
| 9,447,680 B2 | 9/2016 | Thornton |
| 10,473,813 B2 | 11/2019 | Zhou |
| 10,585,209 B2 | 3/2020 | Inanc |
| 2009/0045329 A1 | 2/2009 | Stoller |
| 2013/0206972 A1 | 8/2013 | Zhou |
| 2017/0329041 A1 | 11/2017 | Zhang |
| 2019/0094409 A1 | 3/2019 | Mendez et al. |
| 2020/0326451 A1 | 10/2020 | Schmid et al. |

OTHER PUBLICATIONS

K. Bergaoui, N. Reguigui, C.K. Gary; C. Brown, J. T. Cremer, J.H. Vainionpaa, M.A. Piestrup; Development of a new deuterium-deuterium (D-D) neutron generator for prompt gamma ray neutron activation analysis; Applied Radiation and Isotopes; Sep. 8, 2014; pp. 1-37.

James Hood; High Speed Telemetry Drill Pipe Network Optimizes Drilling Dynamic and Wellbore Placement; 2008 IADC/SPE Drilling Conference held in Orlando, Florida, U.S.A., Mar. 4-6, 2008; pp. 1-8.

Kang Yang; Peter R. Menge; Julien Lejay; Valdimir Ouspenski; Improving the Neutron and Gamma-Ray Response of Cs2LiLaBr6:Ce3+; 2013 IEEE Nuclear Science Symposium & Medical Imaging Conference Oct. 27-Nov. 2, 2013, COEX, Seoul, Korea; p. 1.

International Atomic Energy Agency, Physics Section, Neutron generators for analytical purposes.—Vienna : International Atomic Energy Agency, 2012; pp. 1-91. ; 30 cm.—(IAEA radiation technology reports).

Jerome A Truax, James Witkowsky; Field Test Results of a New Neutron Induce Gamma Ray Spectroscopy Geochemical Logging Tool; 2009 SPE Annual Technical Conference and Exhibition held in New Orleans, Louisiana, USA, Oct. 4-7, 2009; pp. 2-23.

METHOD FOR OBTAINING NEAR-WELLBORE TRUE BOREHOLE SIGMA AND TRUE FORMATION SIGMA BY USING A NUCLEAR LOGGING TOOL DURING OIL AND GAS EXPLORATION

TECHNICAL FIELD

The present disclosure relates generally to wireline or logging-while-drilling systems and methods by using pulsed neutron sources and multiple dual-function radiation detectors of neutrons and gamma rays that can be priorly distinguished using pulse shape discrimination techniques to measure thermal neutron time-decay signals and thermal neutron capture gamma ray time-decay signals to obtain borehole sigma and formation sigma.

BACKGROUND OF INVENTION

1. Overview

Neutron logging began in the early 1940s as an innovative method for measuring subsurface formations of interest and geological structures. It was first introduced using a chemical neutron source, particularly RaBe, in combination with a single radiation detector used primarily for counting gamma rays emitted when hydrogen and chlorine captured certain thermal neutron. An example of said tools was first introduced in the 1960s by Dresser Atlas, a predecessor of Baker Atlas. This tool had proven to be very successful at determining water saturation in saltwater-bearing reservoirs. Nonetheless, it was soon discovered that because hydrogen had by far the greatest effect on neutron transport, the borehole effects on such tool are large. Therefore, a compensating tool had to be incorporated wherein an isotopic source (most often americium-beryllium) with, in this case, two neutron-radiation detectors were used to measure the size of the neutron cloud by characterizing the falloff of neutrons between said two detectors. The use of neutrons proved to be a better solution as they penetrate further than gamma rays, therefore minimizing the complexity of said tools. Furthermore, said tool required little collimation and did not be pressed against the borehole wall.

Later, to measure the macroscopic thermal neutron capture cross-section (Sigma) of the formations surrounding a borehole, further computation was needed and therefore the introduction of measuring the decline of the thermal neutron population in said formations within a fixed period was required. As such, Dresser Atlas, introduced the measuring of the emission of a burst of high energy neutrons which were then divided by the radiations of such thermal neutrons into two equal groups, and then used to computed compute the rate of change over the selected time interval. The basic theory behind all of this comprised of neutrons being emitted from a source, wherein said neutrons interacted with the surrounding rock formations in several ways depending on the local geology. Particularly, water and hydrocarbons will slow down (thermalize) the neutrons, then neutrons will scatter inelastically from some elements resulting in the emission of gamma rays, and finally certain elements will capture the neutrons either right away or after they slow down, emitting gamma rays and reducing neutron flux.

Thereafter, several other techniques were also developed to obtain more accurate measurement results, which incorporated the correction of thermal neutron diffusion effects and near-wellbore environmental effects, such as wellbore size, casing size, wellbore fluid, cement thickness etc., so that pulse neutron tools can be operated in a variety of field applications. However, those environmental corrections were (and still are) often quite complicate but not extensively complete and perfect in all field situations.

In particular, the two most common methods where pulse generator tools have been used are for wireline measurement, and logging-while-drilling (LWD). For wireline measurements, the entire drill string is removed and the measurement tool string inserted into the well, causing the measurements to be done from the bottom up. In contrast, during LWD the measuring tools are included in the drill string, and data collected is telemetered to the surface.

Fast forward a few decades and a typical modern sigma logging tool nowadays would consist of a deuterium-trillium (D-T) pulsed neutron generator and two, single source detectors (i.e. either thermal neutrons or gamma rays but not both). The D-T neutron generator seems to have been chosen as the default source, because the cross section of D-T fusion reaction is two orders of magnitude higher than that of a deuterium-deuterium (D-D) reaction. As a result, the neutron yield of a D-T generator is two orders of magnitude higher than that of a D-D neutron generator when the current of D ions is same. As a result, detector count rates are much higher, which resulted in a much smaller statistical uncertainty when a D-T neutron generator is utilized in the tool. The detectors, due to their computational shortcoming were only programmed to detect either the time-decay of thermal neutrons by using two neutron detectors, or the time-decay of capture gamma rays. In fact, the latter required the use of two specialized gamma ray detectors. For an example, gaseous detectors like He-3 tubes are utilized to detect neutrons and a variety of scintillation detectors (e.g., NaI, CsI, GSO, BGO, LaBr3 scintillators and photomultiplier tubes) are utilized to detect gamma rays. Again, these detectors can only detect either neutrons or gamma rays, but not both.

Nonetheless, among the advantages of using neutron generators one can still find that they: (a) output at least three times as many neutrons per second as the AmBe source they were originally replaces; (b) cause less dose to workers; (c) are easier to store as when they are off, they don't produce any external radiation; (d) are less difficult to license; (e) do not require leak testing; (f) are easier to ship; and (g) allow for more types of measurements because of timing. In general, the purpose of seismic exploration is to image the subsurface of a survey region to identify potential locations of hydrocarbon underneath the surface.

2. Measuring and Detecting

Determining characteristics of earth formations to obtain information indicative of hydrocarbon content is a highly difficult task. In a typical method, high energy neutrons penetrate the subsurface formation and while interacting with the subsurface formation the energy of this neutrons decreases. At low (thermal) energies, neutrons are captured in the nuclei of the constituents, and upon such capture, the energized nuclei release a gamma ray which is detected in logging tool. Since gamma rays are highly energetic and have a relatively long mean-free path, the amplitude and decay time characteristics of the detected gamma rays represent the volume averaged characteristics of the constituents of both the borehole and the surrounding formation. Nonetheless, two primary formation characteristics are interest to those skilled in the art: (a) the macroscopic thermal capture cross-section of the formation (formation sigma, or Sigma, in cu units), and (b) the formation porosity (in p.u. units). Out of the two, macroscopic thermal neutron capture cross section (sigma) logs are the most important in formation evaluation. As such, borehole sigma logs are utilized to examine near wellbore information, such as borehole salinity and its variations inside a wellbore, the changes of casing string, etc. In contrast, formation sigma logs are utilized to evaluate water/oil/gas saturation, water/oil/gas contact locations, and remaining oil and gas reserve of a downhole reservoir.

One proposed method is performed by measuring and fitting the time-decay curve of either thermal neutrons or neutron-capture gamma rays after a neutron pulse (or a number of neutron pulses) using two exponential time-decay functions, a time-decay constant in an early time window which is more sensitive to the material in the borehole region, and the other time-decay constant in a late time window which is more sensitive to the material in formation region, can be obtained. The two time-decay constants can be utilized to obtain the borehole sigma and the formation sigma. And using two detectors helps to correct thermal neutron diffusion effect and obtain other measurements, such as formation porosity.

Another method for determining formation sigma from the processing of the count rate decay curve of the gamma rays sensed in the detector has been proposed, where in essence, the decay curve immediately following the pulsing of the source is used to eliminate the effect of counts due to interactions in the borehole, so that counts due to thermal capture in the formation strongly predominate. The decay time constant of the gamma counts due to thermal neutron capture is then utilized to compute the formation sigma using any one of a variety of known techniques for modeling the interaction of neutrons with matter, e.g., by solving the neutron diffusion equation using terms in which formation sigma is a parameter.

In recent years, the development of $Cs_2LiYCl_6$ (CLYC) and $Cs_2LiLaBr_6$ (CLLB) crystals make it possible to detect both neutrons and gamma rays using one scintillation detector. This would enable a person having ordinary skills in the art to develop a nuclear tool capable of taking more multiple measurements at the same time. Furthermore, since near-wellbore materials have very different effects on the thermal neutron time-decay and capture gamma ray decay, as different materials (wellbore fluids, casing, cement etc.) have different attenuations for thermal neutrons and gamma rays, it would be also possible to automatically compensate all the environmental effects if both thermal neutrons time-decay and capture gamma ray time-decay were measured by using multiple dual-function detectors at different distances from a source.

Recently, two scintillators: $Cs_2LiYCl_6$ (CLYC) and $Cs_2LiLaBr_6$ (CLLB) crystals, were developed, which are sensitive to both neutrons and gamma rays. See J. Glodo, R. Hawrami, K. S. Shah, "*Development of $Cs_2LiYCl_6$ scintillator*", Journal of Crystal Growth, Volume 379, 15 Sep. 2013, Pages 73-78, and Kan Yang, Peter R. Meng, Julien Lejay, Vladimir Ouspenski, "*Improving the Neutron and Gamma-ray Response of $Cs_2LiLaBr_6:Ce^{3+}$*", 2013 IEEE Nuclear Science Symposium & Medical Imaging Conference, Oct. 27-Nov. 2, 2013, COEX, Seoul, Korea. Basically, these new scintillators were coupled to scintillation-light-sensitive components, such as a photomultiplier tube (PMT), and were proven to effectively detect both neutrons and gamma rays.

Also in recent years, major improvements have been reached pertaining the technology used in neutron pulse generator. Originally, most neutron pulse generators comprise primarily of deuterium-tritium (D-T), which is known to require special controls. Nonetheless, persons skilled in the art are beginning to consider the use of deuterium-deuterium (D-D) for their logging application but the computational methods are lagging. This is mainly given by the fact that the statistical uncertainty of a sigma measurement due to low neutron yield from a D-D generator is substantially reduced. As a result, the application of D-D has been limited to mostly experimental in nature. Nonetheless, since the neutron energy from a D-D neutron generator is much lower than that from a D-T neutron generator (2.45 MeV vs 14.1 MeV), gamma rays from fast neutron inelastic scattering is significantly reduced, as 2.45 MeV neutrons would not initiate as much as fast neutron inelastic scattering on elements as 14.1 MeV neutrons. Consequently, the effect of background gamma rays from fast neutron inelastic scattering on the capture gamma ray time-decay measurement is substantially reduced. Therefore, the background from neutron inelastic gamma rays particularly affects the time-decay measurement in the early time window.

Due to the foregoing and considering the current methods and systems in obtaining borehole sigma and formation sigma measurements and new advances in detector technology, a more advanced nuclear logging computational method, which has potential to take multiple measurements accurately and compensate for all environmental effects automatically is needed.

3. Principles of Formation Sigma Measurement

The formation sigma is typically measured by irradiating a formation with short fast neutron pulses from a D-T neutron generator. Fast neutrons are quickly slowed down to thermal energies after a pulse by successive inelastic scattering and elastic scattering with nuclei of elements in the surrounding media. Then the thermalized neutrons are captured by the formation elements and gamma rays are emitted. The rate at which thermal neurons are captured, and therefore the emitting rate of captured gamma rays after the pulse, depends on the macroscopic cross section of the formation to thermal neutrons, which can be expressed by an exponential decay with the time in an infinite media.

When the frequency of neutron pulses from a neutron generator is low (e.g., 1 kHz) and the neutron duty time is short (e.g., 30 µs), the long time (e.g., from 30 µs to 1000 µs) between the neutron pulses would allow one skilled in the art to obtain the thermal neutron time-decay curve, either by detecting the thermal neutron time-decay directly or the capture gamma ray time-decay indirectly by detectors.

In a typical well logging situation, the materials in the wellbore region, such as borehole fluid in an open hole or casing and cement in a cased hole, are usually significantly different from the formation. Hence, the total time-decay is not a singular exponential decay. If thermal neutron diffusion effect is ignored, the thermal neutron fluence rate and therefore the detector count rate in the vicinity of a well borehole following a burst of high energy neutrons, may be described as the sum of two exponential decays (one is a borehole component, where borehole decay dominates the decay in an early time window, the other is a formation component, where formation decay dominates the decay in a later time window) and a background component. This may be expressed mathematically as in Equation 1:

$$C(t) = A_b e^{-\Sigma_b v t} + A_f e^{-\Sigma_f v t} + B \qquad (1)$$

Where C(t) is the count rate in the unit of count per second (cps) measured at a detector at time t in the unit of microsecond (μs), the reference time may be the start of a neutron pulse. $A_b$ and $A_f$ are constants which may be interpreted as initial amplitudes of the borehole component and the formation component, in the unit of cps. $\Sigma_b$ and $\Sigma_f$ is acroscopic thermal neutron capture cross-section (sigma) of the borehole and the formation, respectively, in the unit of 1/cm v is the thermal neutron speed, in the unit of cm/μs. B represents the background, in the unit of cps.

It is well-known that when the neutron energy is less than 1 eV, its absorption cross-section increases proportionally to 1/v if the neutron is in equilibrium with a surrounding media. This phenomenon is due to the fact the nuclear force between the target nucleus and the neutron has a longer time to interact. The neuron energy upper limit for 1/v law depends on the element weight, the heavier an element is, the lower the threshold is. Hence, for almost all elements, when the neutron energy is less than the 1 eV, the formulation tends to be as follows:

$$\Sigma \cdot v = k \text{ (constant)} \quad (2)$$

Or $$\Sigma \cdot v = \frac{1}{\tau} \quad (3)$$

Where k is the decay constant in the unit of 1/μs and τ is the mean lifetime of neutrons in material, in the unit of μs. This leads to being able to rewrite Equation (1) as follows:

$$C(t) = A_b e^{-\frac{t}{\tau_b}} + A_f e^{-\frac{t}{\tau_f}} + B \quad (4)$$

Where $\tau_b$ and $\tau_f$ is the mean neutron lifetime of the materials in borehole region and in the formation region, respectively.

In the oil and gas industry, τ has been referred as both the mean neutron lifetime and the time decay constant for a long time in previous literatures. Hence, the mean neutron lifetime and the time decay constant are used alternatively. In fact, because Equations (2) and (3) hold true for all neutrons with energy in the 1/v range, while the upper limit of neutrons in 1/v range for almost all elements is 1 eV; the mean neutron lifetime is constant not only for thermal neutrons, but also epithermal neutrons in the measurement.

Furthermore, in the oil and gas industry, the unit of the macroscopic thermal neutron capture cross-section Σ is capture unit (c.u.), which is one thousandth of 1/cm. Therefore, the thermal neutron capture cross-section can be obtained by using Equation (5) as soon as the neutron decay time constant is measured.

$$\Sigma = \frac{1}{v_n \tau} = \frac{1}{0.2198\tau} = \frac{4.550}{\tau}(1/\text{cm}) = \frac{4.550 \times 10^3}{\tau}(c.u.) \quad (5)$$

Given that the thermal neutron decay constant itself only depends on the density of material, the formation sigma measurement is always accurate for a specific density of material, no matter what the temperature is. The reason is that when the temperature increases, neutron speed increases, but sigma decreases proportionally. As a result, the multiplication of sigma and neutron speed (thermal neutron decay constant) does not change. Furthermore, in accordance with Equation (4) that uses a fixed thermal neutron speed to obtain the formation sigma, the sigma should not change. The only thing a person having ordinary skills in the art may pay attention to, when evaluating formation sigma is the change of density of material, such as the density of formation matrix, the density of pore, due to temperature variations.

4. Principles of Sigma Measurements

Early pulsed neutron tools measured the thermal neutron mean lifetime by using one scintillation counter. Formation sigma was then obtained by using Equation (5). Nonetheless, modern pulsed neutron logging tools incorporate two detectors in sigma measurement. The use of two detectors not only allowed for the development of correction algorithms for neutron diffusion effects and borehole environmental effects on the formation sigma measurement, but also permitted other measurements, such as to obtain a ratio-based formation porosity.

There are two main types pulsed neutron tools for sigma measurement, in which different types of radiation detectors are utilized to detect either neutrons or gamma rays. One is pulsed neutron-neutron (PNN) tools, in which He-3 proportional counters, are utilized to detect the time decay of thermal neutrons directly. The other is pulsed neutron capture (PNC) tools, in which a variety of scintillation detectors, are adopted to detect the time decay of capture gamma rays to obtain the thermal neutron time decay indirectly. Both PNN and PNC tools have their distinctive features, which makes them attractive tools for specific applications.

Particularly, the PNN tools are less affected by background radiations (such as the background from short-lived gamma radiations due to neutron activation) than the PNC tools. That is why the neuron measurement do not need to burst-off background cycle of the source. Since thermal neutrons are much easier to be shielded than capture gamma rays, the formation component has been enhanced by the shielding and/or window design in the tool, so that the tool is only sensitive to thermal neutrons from a particular angle. With such configurations, the detector response to borehole neutrons was minimized, which is especially helpful in wireline logging, where the borehole is usually much larger than the tool diameter. Moreover, the temperature rating of PNN tools is slightly higher due to the use of gaseous He-3 detectors, which have slightly higher temperature rating than traditional scintillation detectors. Furthermore, PNN tools are more sensitive to porosity change when the source-to-detector distances are same as PNC tools. As a result, a shorter source-to-detector distance can be achieved to obtain the same tool sensitivity to the formation porosity, which results in a better vertical resolution of the measurement. Together with its shallower depth of investigation, makes them more attractive to thin bed formation determination.

On the other hand, the PNC tools, have much higher detector counting rate and therefore better statistical uncertainty. Moreover, the penetration ranges of capture gamma rays are longer than that of thermal neutrons, as a result, the depth of investigation of PNC tools is deeper and the measurement is more on the formation than near-wellbore environments. Various techniques have also been developed in the past, such as the progresses on high-temperature scintillation crystals and high-temperature PMTs, the background subtraction techniques, etc., making them very popular in field applications.

5. The Tools: Neutron Generators, Detectors, Electronic Systems, and Non-Transitory Computer Readable Memory Devices for Data Processing As previously discussed, Neutron generators are neutron source devices which contain compact linear particle accelerators and that produce neutrons by fusing isotopes of hydrogen together. The fusion reactions take place in these devices by accelerating either deuterium, tritium, or a mixture of these two isotopes towards a metal hydride target which also contains deuterium, tritium, or a mixture of these isotopes. Fusion of deuterium nuclei (D+D) results in a He-3 nucleus and a neutron with a kinetic energy of approximately 2.5 MeV. Fusion of a deuterium and a tritium nuclei (D+T) result in a He-4 nucleus and a neutron with a kinetic energy of approximately 14.1 MeV. See Reijonen, J. "*Compact Neutron Generators for Medical, Homeland Security, and Planetary Exploration*". Proceedings of 2005 Particle Accelerator Conference, Knoxville, Tenn.: 49-53.

For formation sigma measurement in oil and gas industry, the D-T type neutron generators are commonly utilized in pulsed neutron tools as the neutron outputs are about two orders of magnitudes higher than the D-D type neutron generators. However, the D-D type neutron generators would be more preferred if the outputs of neutrons could be as high as current D-T generators, as the neutron energy from the D-D reaction is much lower than the D-T reaction. As a result, it initiates less gamma rays from inelastic scattering and less background from short-lived gamma ray radiations from fast neutron activations, which affects data processing of capture gamma ray decay from detectors for the PNC tools, especially in the early time of the decay.

Over the years, substantial progresses have been made to continue refine the design and manufacture of pulsed neutron generators, which have improved the neutron yield, reliability, and lifetime of generators greatly. See D. Rose, T. Zhou et al, "*An Innovative Slim Pulsed Neutron Logging Tool*", SPWLA 56th Annual Logging Symposium, Long Beach, Calif., USA, Jul. 18, 2015, and International Atomic Energy Agency, "*Signal Processing and Electronics for Nuclear Spectrometry*", Proceedings of a technical meeting, Vienna, 20-23 Nov. 2007. Furthermore, the neutron duty time and the frequency of the neutron pulse schematics can be adjusted and optimized for the formation sigma measurement by simulations and experiments.

As it pertains to the radiation detectors used in these tools, a person having ordinary skill in the art would soon realize that there exist two main types of detectors utilized in the detection of neutrons or gamma rays in the pulsed neutron tools for formation sigma measurement. One is gaseous detectors, like He-3 tubes to detect neutrons and the other is a variety of scintillation detectors (e.g., NaI, CsI, GSO, BGO, LaBr$_3$ scintillators and photomultiplier tubes) to detect gamma rays. As it can observed, the detectors are used to detect either neutrons or gamma rays, but not both. As previously mentioned, this is not due to a lack of capability in the detectors side, but more so to a lack of development in computer algorithms to first discriminate and then process the two signals.

For scintillation detectors, the scintillators change the deposited energy of gamma rays into scintillation lights. The PMTs change the scintillation lights into electrons and magnify amplify them to form electronic signals.

Traditional gamma ray detectors are not sensitive to neutrons and traditional neutron detectors are not sensitive to gamma rays. The recent development of new scintillators, such as $Cs_2LiYCl_6$ (CLYC) and $Cs_2LiLaBr_6$ (CLLB) crystals, which are sensitive to both neutrons and gamma rays, makes it possible to design a pulsed neutron tool, which is capable to detect both neutrons and gamma rays at the same time and therefore feasible to provide more multiple measurements than a single PNN tool or a single PNC tool.

As far as electronic systems go, a person having ordinary skills in the art will soon realize that all nuclear logging tools contain electronic circuits and devices, commonly referred to as front-end electronics, which accept and process the electrical signals produced by radiation detectors. These front-end electronics are composed of a chain of signal processing subsystems that filter, amplify, shape, and digitize these electrical signals to finally produce digitally encoded information, such as type, time, and energy the radiation that stimulated the radiation detector. The objective of front-end electronics is to obtain maximum information about the radiation and with the highest possible accuracy. Historically, the front-end electronics has consisted of all analog components. Nonetheless, with the development of digital electronics, programmable logic, and digital signal processing techniques, the performance delivered has increased continually over time through the development and implementation of new and improved analog electronics and electronic designs, thereby opening new opportunities, and delivering new benefits not previously achievable.

Similar situation is observed with the implementation of non-transitory computer readable memory devices in either wireline logging or logging-while-drilling (LWD) operations.

In wireline logging, the measured data itself is recorded either at surface, or in the hole as an electronic data format and then either a printed record or electronic presentation called a "well log" is provided to a person having ordinary skills in the art, along with an electronic copy of the raw data. The data is recorded directly against measured depth. Memory data is recorded against time, and then depth data is simultaneously measured against time. The two data sets are then merged using the common time base to create an instrument response versus depth log. The measured cable depth can be derived from several different measurements but is usually either recorded based on a calibrated wheel counter, or (more accurately) using magnetic marks which provide calibrated increments of cable length. The measurements made must then be corrected for elastic stretch and temperature.

In LWD, measured data is transmitted to the surface in real-time via pressure pulses in the well's mud fluid column. This mud telemetry method provides a bandwidth of less than 10 bits per second, although, as drilling through rock is a slow process, data compression techniques are necessary so that this is an ample bandwidth for real-time delivery of information. A higher sample rate of data is recorded into memory and retrieved when the drill string is withdrawn at bit changes. High-definition downhole and subsurface information is available through networked or wired drill pipe that deliver memory quality data in real time.

6. Conclusion

Given the above complexities, a person with ordinary skills in the art would soon realize that it is common to see different companies developing their logging tools and data processing algorithms independently from each other, to better suit their project or clients' constraints. Nonetheless, as discussed earlier, in formation sigma measurement, a well-accepted methodology is to fit either the thermal neutron decay curve or the capture gamma ray decay curve by using two exponential decays for each of two detectors. Therefore, the apparent borehole sigma and the apparent formation sigma are obtained typically from just the use of two detectors. It is just that the apparent borehole sigma from the near detector provides a better borehole sigma estimation, and the apparent formation sigma from the far detector provides a better formation sigma estimation. The corrected borehole sigma and the corrected formation sigma can be expressed as functions of the apparent borehole sigma and the apparent formation sigma from two detectors, as the apparent borehole sigma and the apparent formation sigma are not totally independent to each other.

In conclusion, in existing pulsed neutron tools, the borehole sigma and the formation sigma are obtained by measuring and fitting either the decay of thermal neutrons, or the decay of capture gamma rays, and then corrections are made by algorithms. However, not both decay of thermal neutrons and decay of capture gamma rays are obtained and analyzed for the borehole sigma and the formation sigma as introduced in the present disclosure.

SUMMARY OF THE INVENTION

In view of the foregoing, various embodiments of the present invention advantageously provide systems and methods which use pulsed neutron sources and multiple dual-function radiation detectors of neutrons and gamma rays that can distinguish between neutron and gamma rays using pulse shape discrimination techniques to measure thermal neutron time-decay signals and thermal neutron capture gamma ray time-decay signals to obtain borehole sigma and formation sigma.

Typically, exploration and reservoir characterizations are performed over a region that is surveyed for its soil, and fluid potential properties. Depending upon the properties found in the survey region, one or various hydrocarbon reservoirs (i.e., oil and gas) may be revealed. Nonetheless, noise and measurement errors are introduced by the recording mediums, transmission mediums, and digitization processes used during the identification of hydrocarbon reservoirs, thereby causing problems during said identification. As such, most methods that are usually implemented to solve these problems are often quite complicate but not extensively complete and perfect in all field situations. Therefore, the data gather most certainly will not meet certain requirements, thereby requiring the use of the present novel system and method.

In one embodiment of the present invention, the tool consists of a pulsed neutron source coupled with at least three dual-function radiation detectors, high-voltage suppliers and an electronic instrument having non-transitory computer readable memory device for performing the operations of processing, generating, and computing. The detectors may be placed at one end, or both ends of the neutron source at optimized distances to the source. The detectors are capable to detect both neutrons and neutron-induced gamma rays simultaneously. Signals of neutrons and gamma rays from the detectors can be distinguished using a pulse shape discrimination technique, and the measured thermal neutron time-decay signals and capture gamma ray time-decay signals at multiple detectors are utilized to obtain borehole sigma and formation sigma.

The use of multiple dual-function detectors in the present disclosure has potential not only to reduce the type and number of total detectors inside of a tool, but also to take more multiple measurements at the same time and to automatically correct near-wellbore environmental effects, and therefore to provide more accurate measurement results.

In certain embodiments of the present disclosure, the pulsed neutron source, and the three dual-function radiation detectors can be disposed at the same radial or different directions, i.e., having the same or different tool face angles when deployed in the formation. Nonetheless, other embodiments of the present disclosure may have more than three detectors. For example, a system that has six detectors can be disposed opposite to each other on the cross-sectional area of the logging tool, i.e., the tool face angle. Having different tool face angles allows detectors to be placed in multiple ways, to preferentially receive neutrons and gamma-rays at certain incident angles from the formation. It also increases the detection efficiency of neutrons and gamma rays by increasing the total count rate of all the detectors. Similarly, the nuclear logging tool may have more than one neutron sources, which can be turned ON or OFF simultaneously to increase the count rates of the dual-function radiation detectors, thereby reducing the statistical measurement of uncertainty.

For a pulsed neutron tool with three dual functional detectors, the thermal neutron count rate time-decay curve obtained at each detector, is processed to obtain two apparent time-decay constants (i.e., an apparent borehole time decay constant $\tau_{bnn}$, and an apparent formation time-decay constant, $\tau_{fnn}$ from the near detector), related to an early time-decay component and a later time-decay component. Therefore, three pairs of apparent time-decay constants $(\tau_{bnn}, \tau_{fnn}; \tau_{bnm}, \tau_{fnm}; \tau_{bnf}, \tau_{fnf})$ can be obtained by the three detectors (the near detector [n], the middle detector [m], and the far detector [f], respectively), which are then utilized to obtain a neutron-induced borehole time-decay constant $\tau_{bn}$, and the neutron-induced formation time-decay constant $\tau_{fn}$. Similarly, three pairs of apparent time-decay constants ($\tau_{bgn}$, $\tau_{fgn}$; $\tau_{bgm}$, $\tau_{fgm}$; $\tau_{bgf}$, $\tau_{fgf}$) are obtained by the three detectors, which are then utilized to obtain a gamma-induced borehole time-decay constant $\tau_{bg}$, and a gamma-induced formation time-decay constant $\tau_{fg}$. Finally, a true borehole time-decay constant $\tau_b$ can be obtained by using the neutron-induced borehole time-decay constant $\tau_{bn}$ and the gamma-induced formation time-decay constant $\tau_{bg}$. A true formation time-decay constant $\tau_f$ can be obtained by using the neutron-induced formation time-decay constant $\tau_{fn}$ and the gamma-induced formation time-decay constant $\tau_{bg}$.

Likewise, in another embodiment of the present disclosure, it can also be obtained three pairs of apparent sigmas $(\Sigma_{bnn}, \Sigma_{fnn}; \Sigma_{bnm}, \Sigma_{fnm}; \Sigma_{bnf}, \Sigma_{fnf})$ from thermal neutron decay and three pairs of apparent sigmas $(\Sigma_{bgn}, \Sigma_{fgn}; \Sigma_{bgm}, \Sigma_{fgm}; \Sigma_{bgf}, \Sigma_{fgf})$ from capture gamma ray decay by the three detectors, after obtaining the time decay constants. Those apparent sigmas are utilized to obtain a neutron-induced borehole sigma $\Sigma_{bn}$, the neutron-induced formation sigma $\Sigma_{fn}$, a gamma-induced borehole sigma $\Sigma_{bg}$, and a gamma-induced formation sigma $\Sigma_{fg}$. Finally, a true borehole sigma a can be obtained by using the neutron-induced borehole sigma $\Sigma_{bn}$ and the gamma-induced formation sigma $\Sigma_{bg}$. A true formation sigma $\Sigma_f$ can be obtained by using the neutron-induced formation sigma $\Sigma_{fn}$ and the gamma-induced formation sigma $\Sigma_{fg}$.

The non-transitory computer readable memory device contains a computer program product operable on said device to perform the operations or instructions of processing, generating, and computing. Said device is coupled through a communication bus to a memory resource and a telemetry device for transmitting information. Upon finalizing its computational processes, embodiments of the present invention generate interim results that are used by the computer program embodied in the non-transitory memory to generate results which typically comprises true borehole sigma ($\Sigma_b$) and true formation sigma ($\Sigma_f$). Such results may be stored locally within the systems or in databases located within application servers. Further, test results showed that the present invention using systems and methods which use pulsed neutron sources and multiple dual-function radiation detectors of neutrons and gamma rays that can distinguish between neutron and gamma rays using pulse shape discrimination techniques in order to measure thermal neutron time-decay signals and thermal neutron capture gamma ray time-decay signals to obtain borehole sigma and formation sigma; has great potential for other practical applications, as well.

Nevertheless, further details, examples, and aspects of the invention will still be described below in more detail, also referring to the drawings listed in the present invention.

BRIEF DESCRIPTION OF THE DRAWINGS

The teachings of the present invention can be readily understood by considering the following detailed description in conjunction with the accompanying drawings. As such, the manner in which the features and advantages of the invention, as well as others, which will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION OF THE INVENTION

Figure 1:
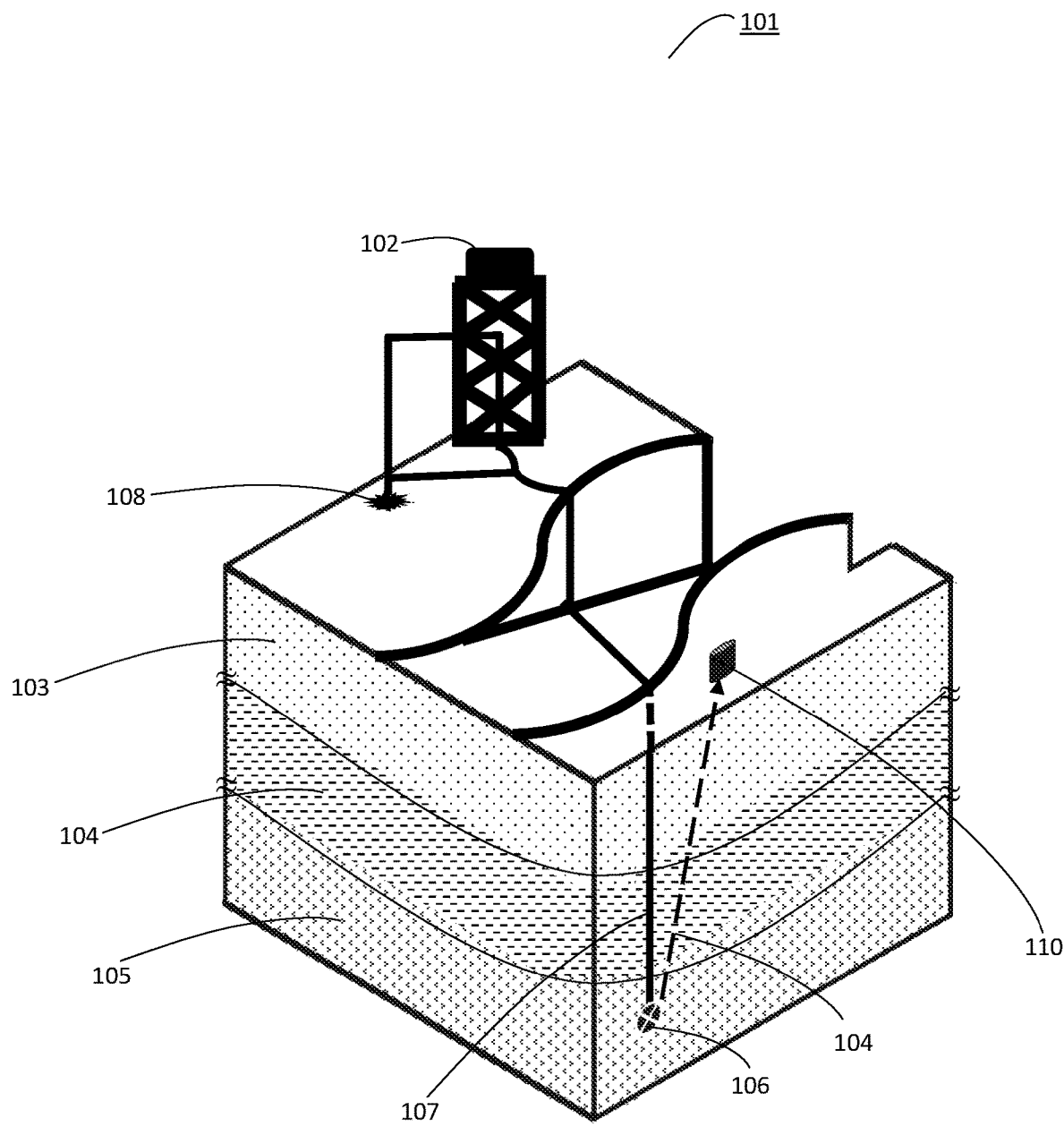
FIG. 1, is a schematic diagram showing a cross-sectional view of a survey region with a well location, source locations, receiver locations, a pulsed neutron logging system having at least three dual-function radiation detectors, according to an embodiment of the present disclosure.

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a system result in the execution of the method.

Additionally, the flowcharts and block diagrams in the Figures ("FIG.") illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

Any reference in the specification to a computer program product should be applied mutatis mutandis to a system capable of executing the instructions stored in the computer program product and should be applied mutatis mutandis to method that may be executed by a system that reads the instructions stored in the non-transitory computer readable medium.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

There may be provided a system, a computer program product and a method for dissipation of an electrical charge stored in a region of an object. The region of the object may be any part of the object. The region may have any shape and/or any size.

The object may be a part of the system. Alternatively, the object may be a substrate or any other item that may be reviewed by the system, inspected by the system and/or measured by the system.

As previously mentioned, no one system and method exist that provides effective means for a three-region (i.e.; borehole region, shallow region containing artificial constituents immediately surrounding the borehole, and the natural formation region) analysis. This is true particularly since thermal neutrons have a shallower depth of investigation (DOI) than gamma rays. Furthermore, as the wellbore materials and artificial constituents surrounding the borehole have different attenuation effects on thermal neutrons and capture gamma rays, combining the two measurements provides a potential way to automatically compensate these near wellbore effects on the measurement, especially when multiple detectors are used, as the measurement can be affected by multiple near wellbore parameters, such as wellbore sizes, borehole salinity, casing thickness etc.

Turning over to FIG. 1, it represents a typical survey region 101, over a land-based region, showing a drilling rig 102 and drill string in which the present invention can be implemented as it penetrates through different types of earth formation, 103, 104, 105, in which an embodiment of the present invention is useful. Persons of ordinary skill in the art, will recognize that seismic survey regions produce detailed images of local geology to determine the location and size of possible hydrocarbon (oil and gas) reservoirs, and therefore a well location 106. Nevertheless, as observed in FIG. 1, when using wireline or logging-while-drilling (LWD) downhole systems 107 during directional drilling, to reach the well or reservoir 106, the wireline or LWD downhole system 107 must deviate from a vertical downward trajectory to a trajectory that is kept within prescribed limits of azimuth and inclination to reach a well or reservoir 106. This degree of deviation is given by a myriad of situations, but most likely due to populated or obstructed areas.

In these survey regions 101, a platform and derrick assembly 102 maybe also positioned over a wellbore for direct penetration of subsurface formations. Nonetheless, downhole system 107 includes drill bit at its lower end to help penetrate the subsurface formations and reach the required reservoir. Furthermore, drilling fluid or mud stored in pit 108 is formed at the well site and sent through the mud channel 203 to lubricate the wireline or logging-while-drilling (LWD) downhole system 107 drill bit which thereafter is also used to carry formation cuttings up to the surface as it is returned to pit 108 for recirculation. Of further importance, the wireline or logging-while-drilling (LWD) downhole system of the present disclosure includes a bottom hole assembly (BHA), 202, generally disposed near the drill bit with capabilities for measuring, processing, computing, generating, and storing information, as well as wirelessly (109) or wired communicating with an above-surface processing system 110 incase further processing is required.

The measurement tools included in the BHA includes dual-function neutron and gamma ray radiation detector sensors, as well as acoustic, and resistivity logging instruments.

Figure 2:
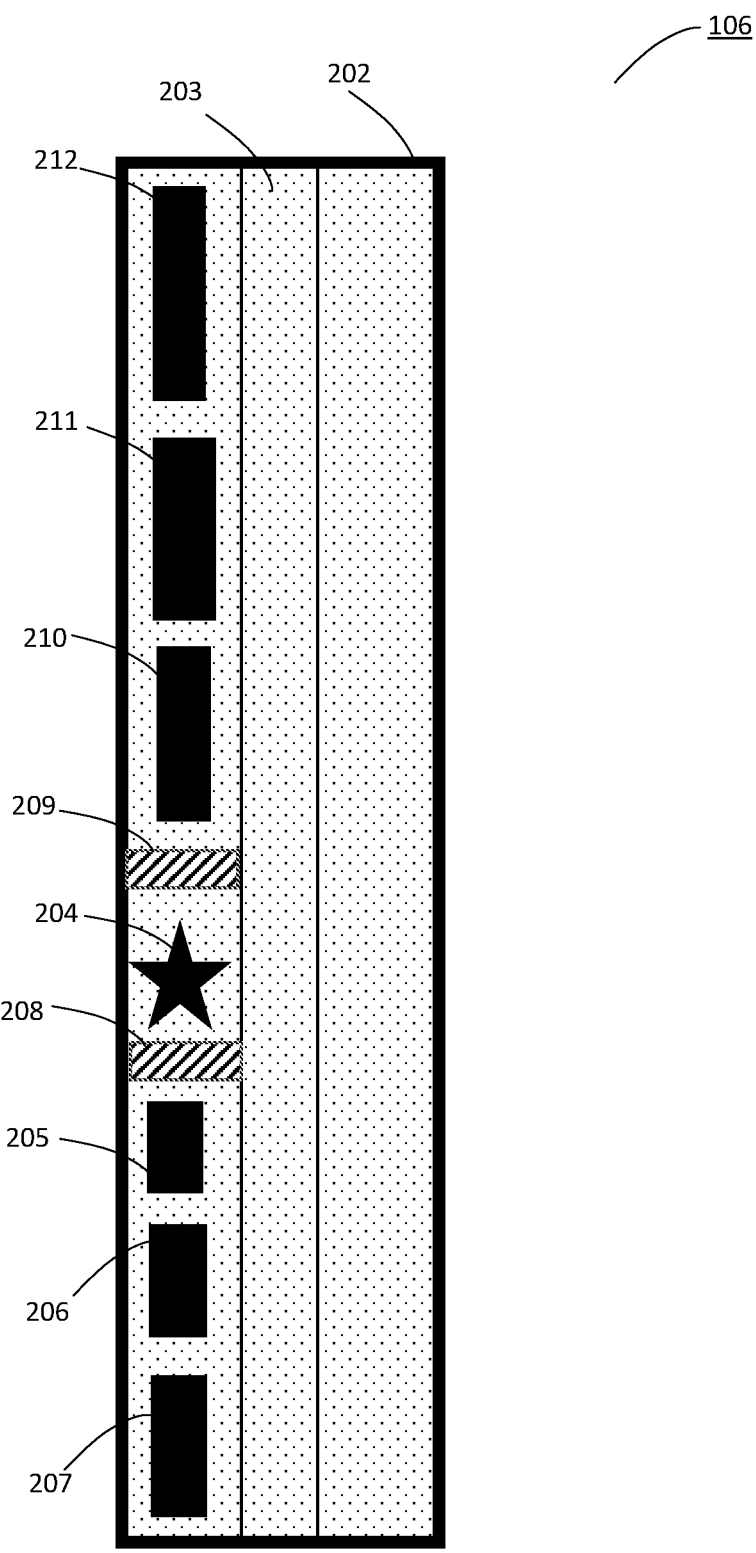
FIG. 2, illustrates a schematic diagram showing a cross-sectional view of a logging-while-drilling system with a pulsed neutron tool with a pulsed neutron source and three dual-function radiation detectors, namely a near detector, a middle detector, and a far detector, according to an embodiment of the present disclosure.

The above-mentioned internal components of the wireline or logging-while-drilling (LWD) downhole system 107, particularly the BHA section, 202, are disclosed in FIG. 2. Said BHA section 202 of the wireline or logging-while-drilling (LWD) downhole system 107 of the present disclosure, further illustrates a pulsed neutron tool consisting of a pulsed neutron source, 204, and three dual-function radiation detectors, namely a near detector 205 (represented in algorithms by the subscript letter n), a middle detector 206 (represented in algorithms by the subscript letter n), and a far detector 207 (represented in algorithms by the subscript letter f). For the present disclosure to properly function, the pulsed neutron source 204 can be either a deuterium-tritium (D-T) neutron generator or a deuterium-deuterium (D-D) neutron generator. Which one (D-T vs. D-D) to use in the tool 202 is mainly dependent on the required measurements and the neutron yield of a generator.

If measurements, such as the spectroscopy measurement is required to obtain C/O logs for oil saturation or to identify formation elements and obtain their concentrations in minerology determination, then a D-T neutron generator is the better option, as not only the energy of neutrons from the D-T reaction is much higher than the D-D reaction, which is important to initiate neutron inelastic scattering on many elements, such as C, O, Fe etc., but also the neutron yield from the D-T reaction is two orders of magnitude higher than the D-D reaction when the d ion current is same, due to the higher cross section of the D-T fusion reaction. Nonetheless, the frequency and pulse schematics would need to be balanced or properly designed for all measurements. On the other hand, if formation sigma was the only required measurement and the neutron yield of a D-D generator is as high as that of current D-T generators (in the order of magnitude of $10^8$ n/s), then a D-D generator would be preferred in the formation sigma measurement, as it doesn't irradiate as much as gamma rays from neutron inelastic scattering as a D-T generator, which contributes to the background of the decay curve in the very early time after a neutron pulse, especially for a system where scintillation detectors are utilized to detect capture gamma rays. The frequency of the D-D neutron pulses can be about 1 kHz with the neutron duty time about 50 µs. The time interval of about 950 µs between the neutron pulses is long enough for fast neutrons to be slowed down to thermal energy and decayed to the background level.

In embodiments of the present disclosure the nuclear logging tool of the BHA section 202, may have more than one neutron sources 204. Under said embodiment, one neutron source 204 maybe located at the proximal end and the other at the distal end BHA section, 202, while the radiation detectors 205, 206, and 207 can be arranged alternating between said sources. In the case of a dual neutron source 204, they can be alternately turned ON or OFF, thereby inducing neutrons and gamma-rays from the formation alternately, which are received by the radiation detectors 205, 206, and 207. Since there are four different source-to-detector distances (d1 to d4), the data generated in near detector 205 and middle detector 206 may be better compensated than tools with only two or three source-to-detector distances for near wellbore effects, such as borehole size, tool standoff, mud weight and/or salinity, casing size, cement thickness, etc. As a result, the obtained formation parameters will be more accurate. Nonetheless, when the sources 204 and detectors 205, 206, and 207 have different tool face angles, the data generated in near detector 205 and middle detector 206 will reflect different sectors of the formation, which can then reveal differences amongst various formation sectors at any given time by comparing the measurements from the near detector 205 and middle detector 206.

As it pertains to the three detectors, 205, 206, and 207 embodiments of the present invention use solely those that detect both neutrons and gamma rays. The crystal used in the detectors can be either $Cs_2LiYCl_6$ (CLYC) or $Cs_2LiLaBr_6$ (CLLB), which are sensitive to both neutrons and gamma rays. However, a $Cs_2LiLaBr_6$ (CLLB) crystal is preferred as it performs better at higher temperatures. Therefore, it would not be necessary to have a cooling device, such as a flask, to house these detectors as observed with existing technologies. By coupling said detectors to a scintillation light sensitive component, such as a photomultiplier tube (PMT), such scintillator can be effectively utilized to detect both neutrons and gamma rays. The three dual-function radiation detectors 205, 206, and 207 are pre-programmed through a non-transitory computer-readable memory device using pulsed shape discrimination technique. The three detectors, 205, 206, and 207 may be placed at one end of the pulsed neutron source or one detector may be placed at one end and the other two detectors may be placed at the other end of the pulsed neutron source. Nonetheless, persons having ordinary skills in the art will soon recognize that certain embodiments of the present disclosure, can also dispose the pulsed neutron source 204, the near detector 205, the middle detector 206, and the far detector 207, at the same radial or different directions, i.e., having the same or different tool face angles when deployed in the formation. In other embodiments of the present disclosure, the wireline or logging-while-drilling (LWD) downhole system 107, particularly the BHA section, 202 may have more than three detectors. For example, it can have six detectors, wherein said detectors are disposed opposite to each other on the cross-sectional area of the logging tool (i.e., the tool face) at angles of 0 degrees and 180 degrees, while the rest being disposed at 120 degrees apart on the cross-sectional area of the wireline or logging-while-drilling (LWD) downhole system 107. The positioning of the detectors not only allows for persons having ordinary skills in the art to use different tool face angles, but it also allows detectors to preferentially receive neutrons and gamma-rays at certain incident angles from the formation. Furthermore, it also increases the detection efficiency of neutrons and gamma rays by increasing the total count rate of all the detectors.

Other embodiments of the present disclosure have within the BHA section, 202, of wireline or logging-while-drilling (LWD) downhole system 107, four radiation detectors and two neutron sources. In this embodiment, detectors are paired and disposed at substantially the same distance from the different sources. As indicated before, having more than one detector at a certain distance increase the count rate at that distance so that a less powerful neutron source may be viable. The count rate of one far detector may be too low to provide reliable measurement data, therefore by using two or more far detectors, the count rate will be significantly increased so that reliable measurement results can be obtained by processing data from the multiple far detectors.

Further, embodiments of the present disclosure illustrate a logging tool BHA section, 202, of the wireline or logging-while-drilling (LWD) downhole system 107, with multiple shields 208 that can absorb neutrons and gamma-rays. The shields need to be placed in the logging tool BHA section, 202, of the wireline or logging-while-drilling (LWD) downhole system 107 between the neutron source, 204, and the detectors 205, 206, and 207, as well as between 209 the neutron source 204 and the rest of the internal equipment 210, 211, and 212 so that said detectors receive neutrons and gamma-rays coming from the formation rather than traveling through the logging tool itself. Alternatively, the detectors can also be partially shielded by the shielding material that absorbs neutrons and gamma rays from certain directions. The shields 208 and 209 are made of, or contain, one or more materials that can effectively attenuate both thermal neutrons and gamma rays. The materials of the shields 208 and 209 can contain materials chosen from heavy elements having high thermal neutron absorption cross sections, including metals such as gadolinium (Gd), samarium (Sm), metal oxides such as $Gd_2O_3$, $Sm_2O_3$, $B_2O_3$, alloys containing Gd or Sm with other heavy metals, such as Fe, Pb, or W, or materials containing boron with other heavy elements, such as tungsten borides (WB, $WB_2$, etc.).

Regarding the rest of the internal components of the logging tool BHA section, 202, disposed inside the wireline or logging-while-drilling (LWD) downhole system 107, it is further illustrated a mud channel 203, a high voltage supplier 210, an electronics instrumentation 211 and a telemetry system 212. The mud channel 203 is also used to transmit neutron and gamma measurement data during LWD to the surface, while the on-board electronics instrumentation 211 is also used to process, compute, generated, and store some data of the either the wireline or the LWD tool. For the latter, said data which will typically comprise of all the captured, processed, computed, generated, and stored information achieved during the method herewith disclosed and illustrated in FIG. 3A, FIG. 3B, FIG. 4A, and FIG. 4B, can also be retrieved when the tool back to the surface. Regardless, the essential data is still going to be further processed by the above-surface processing system 110, and further illustrated in FIG. 7. The electronic system 211 assist with the amplification of the signals of neutrons and gamma rays from detectors 205, 206, and 207 which are also distinguished using the embedded non-transitory computer readable memory device of the electronic system 211 from each other, by using a pulsed shape discrimination (PSD) technique, as shown in FIG. 5. Digital signal processing system in the electronic system 211 is a preferred embodiment of the disclosure as it provides more accurate measurement. A telemetry subassembly is also included within the logging tool BHA section, 202, disposed inside the wireline or logging-while-drilling (LWD) downhole system 107, mainly for data and control communication with the earth's surface. Such apparatus may be of any suitable type, e.g., a mud pulse (pressure or acoustic) telemetry system, which receives output signals from the data measuring sensors and transmits encoded signals representative of such outputs to the surface where the signals are detected, decoded in an above-surface processing system 110 and applied to a processor and/or a recorder as further illustrated in FIG. 7.

Figure 3A:
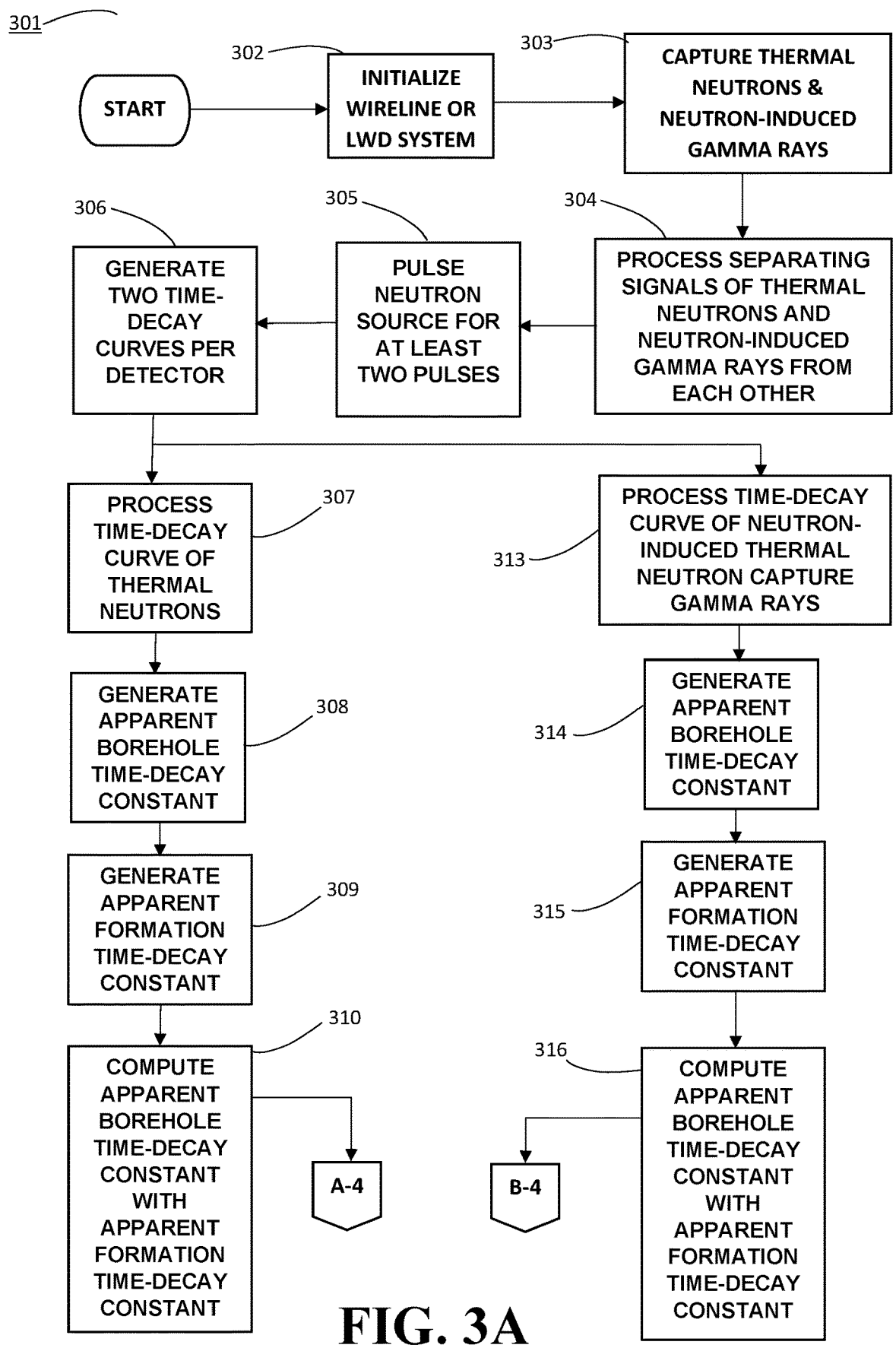
FIG. 3A, and FIG. 3B illustrates a flow chart of the method routine of executing a computer program product for computing near-wellbore true borehole sigma and true formation sigma, using a true borehole time-decay constant and a true formation time-decay constant, according to an embodiment of the present disclosure.
Figure 3B:
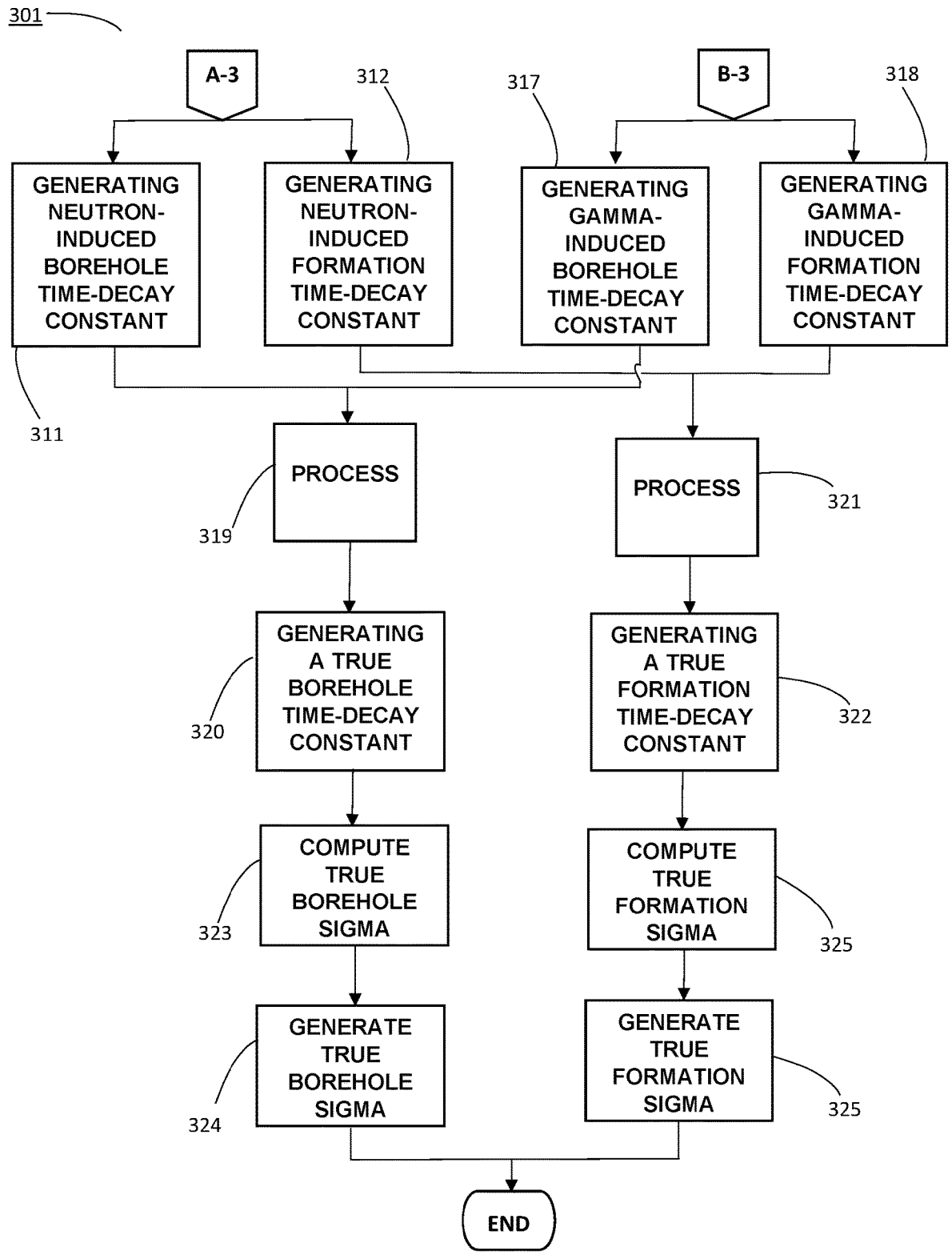

As it pertains to FIG. 3A and FIG. 3B; 301 illustrates a flow chart of the method and instructions used by wireline or LWD tools that incorporate using pulsed neutron sources and multiple dual-function radiation detectors of neutrons and gamma rays each radiation that can be priorly distinguished using pulse shape discrimination techniques in order to measure thermal neutron time-decay signals and thermal neutron capture gamma ray time-decay signals to obtain a borehole sigma and formation sigma. Method 301 considers a configuration of a pulsed neutron tool with three dual functional detectors as previously discussed. The thermal neutron count rate time-decay curve obtained at each detector, can be processed to obtain two apparent time-decay constants related to an early time-decay component and a later time-decay component. Therefore, three pairs of apparent time-decay constants ($\tau_{bnn}$, $\tau_{fnn}$; $\tau_{bnm}$, $\tau_{fnm}$; $\tau_{bnf}$, $\tau_{fnf}$) can be induced and further utilized with the present method to generate a neutron-induced borehole time-decay constant ($\tau_{bn}$) and a neutron-induced formation time-decay constant ($\tau_{fn}$), such as $\tau_{bnn}$, $\tau_{fnn}$; $\tau_{bnm}$, $\tau_{fnm}$; $\tau_{bnf}$, $\tau_{fnf}$ in accordance with Algorithms (6) and (7), respectively. Further, three pairs of apparent time-decay constants ($\tau_{bgn}$, $\tau_{fgn}$; $\tau_{bgm}$, $\tau_{fgm}$; $\tau_{bgf}$, $\tau_{fgf}$) can be induced and further utilized to generate a captured gamma-induced borehole time-decay constant ($\tau_{bg}$) in accordance with Algorithm (8) and a gamma-induced formation time-decay constant ($\tau_{fg}$) in accordance with Algorithm (9), from the three detectors (the near detector, the middle detector, and the far detector, respectively). Then by combining the two borehole time-decay constants ($\tau_{bn}$, $\tau_{bg}$) and the two-formation time-decay constants ($\tau_{fn}$, $\tau_{fg}$) from both thermal neutron decay and capture gamma ray decay, one can get the true borehole time-decay constant ($\tau_b$) in accordance with Algorithm (10), and a true formation time-decay constant ($\tau_f$), in accordance with Algorithm (11). Finally, one may get true borehole sigma ($\Sigma_b$) and true formation sigma ($\Sigma_f$) by applying true borehole time-decay constant ($\tau_b$) and true formation time-decay constant ($\tau_f$) to Equation 4, shown in Algorithms 12 and 13.

Figure 5:
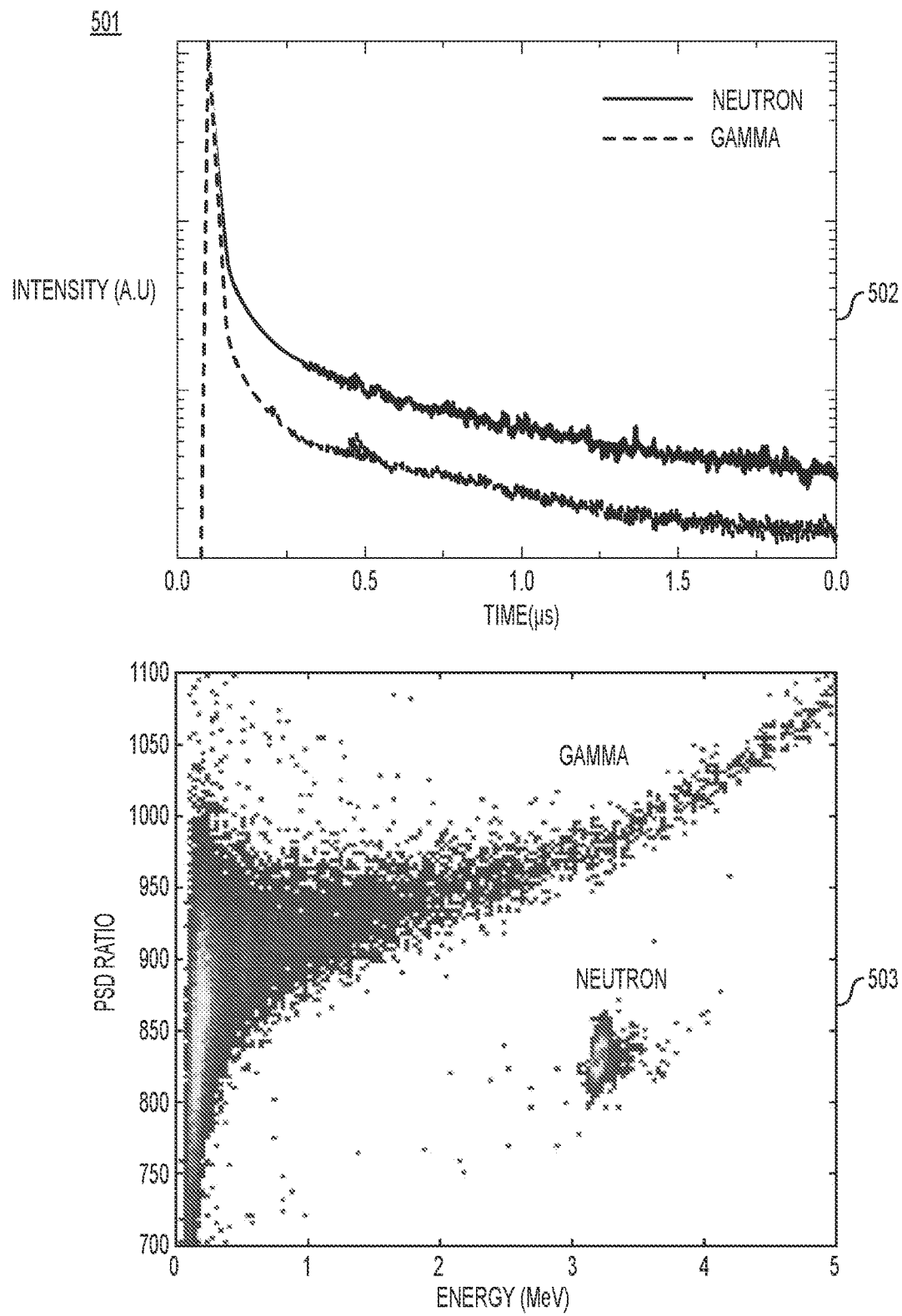
FIG. 5, illustrates the pulse height discrimination technique showing the separation between neutron and gamma rays, according to an embodiment of the present disclosure.
Figure 6A:
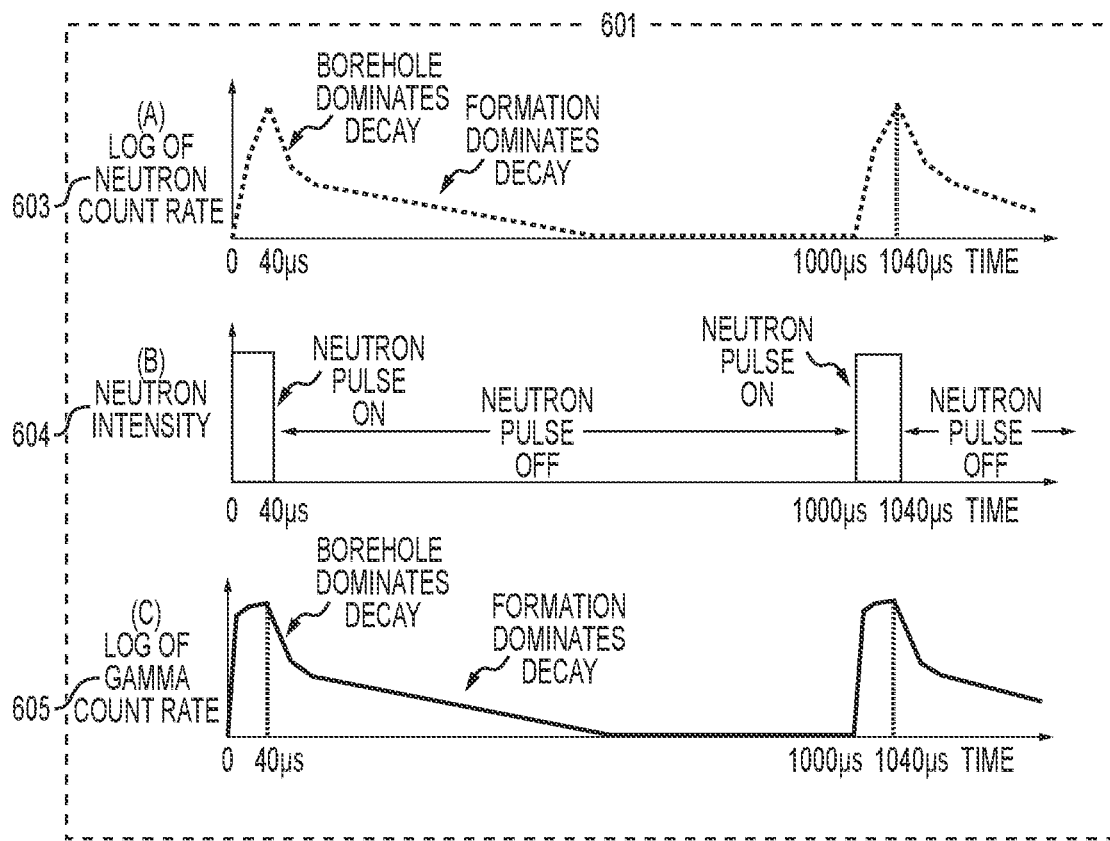
FIG. 6A, FIG. 6B, FIG. 6C, illustrates a thermal neutron count rate decay curve, a neutron intensity, as well as a gamma ray count rate decay curve, for each of the at least three dual-function detectors, according to an embodiment of the present disclosure.
Figure 6B:
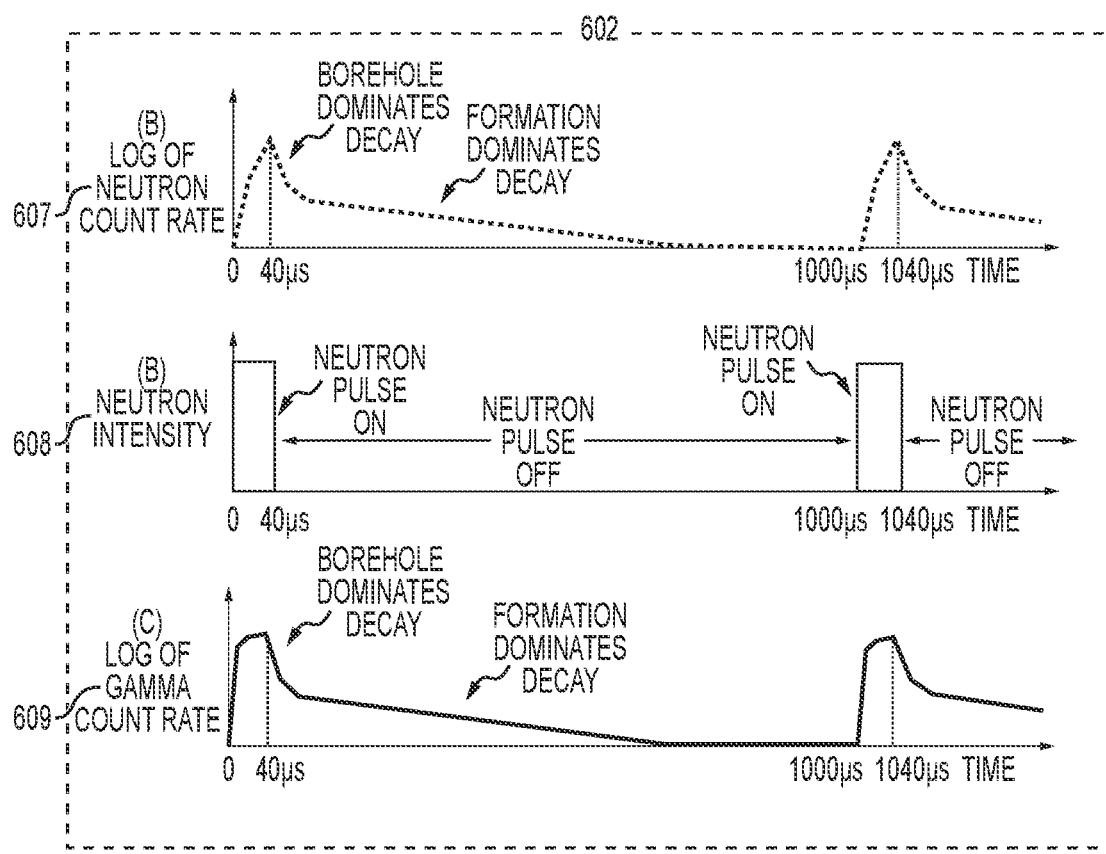
Figure 6C:
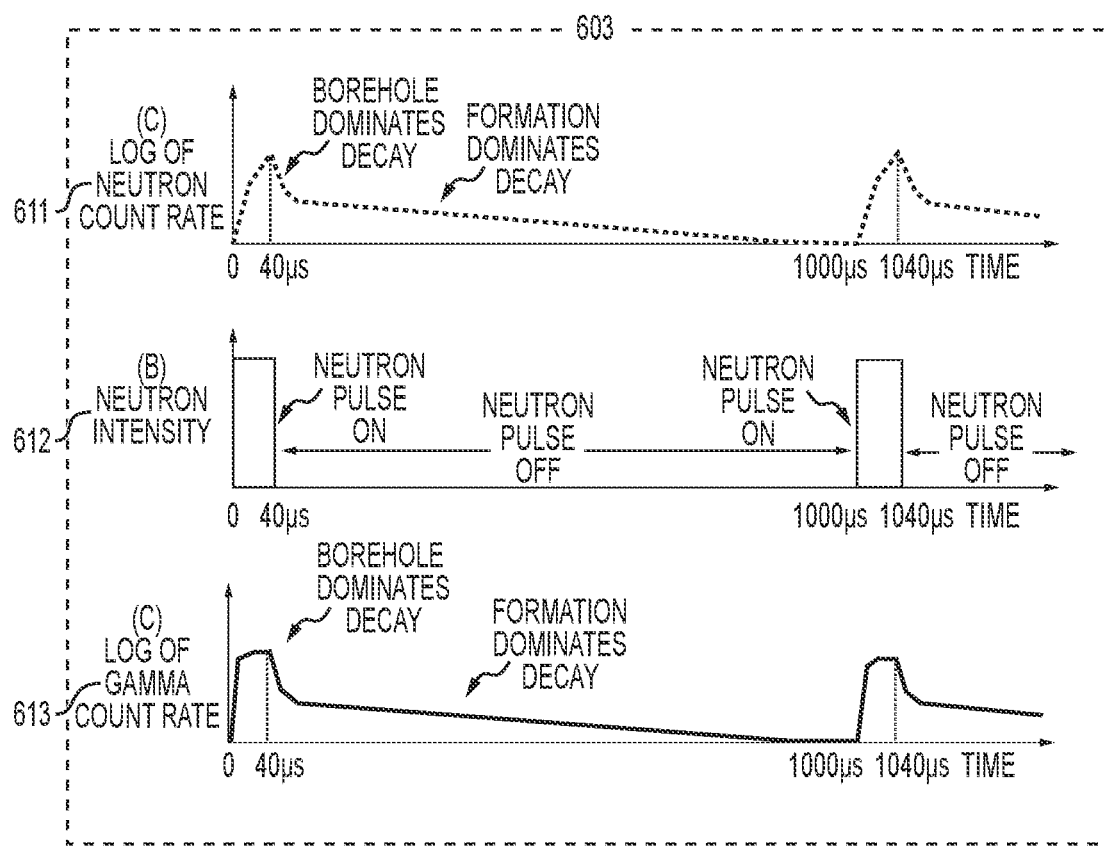

Particularly, method 301 begins when the wireline or LWD system 107 is initialized at 302 by a person having ordinary skills in the art, with a neuron pulse emitted by source 204 of at least 500 Hz and a pulse width of at least 20 microseconds. The thermal neutrons and neutron-induced gamma rays irradiated by the neuron pulse emitted by source 204, are then captured at 303, using the at least three dual-function radiation detectors 205, 206, and 207. Once all dual-function radiation detectors have captured the emitted thermal neutrons and neutron-induced gamma rays, at 304, the pre-programmed non-transitory computer readable memory device uses pulsed shape discrimination (PSD) technique to separate the signals of thermal neutron and neutron-induce gamma rays from each other. An exemplary separation output of the pre-programmed non-transitory computer readable memory device is illustrated in FIG. 5. The neutron source 204 then gets pulsed at 305 at least two more times and then the separated signals of neutrons and gamma rays from each detector are transmitted to the surface via the telemetry host system 212 to the telemetry client system 702 to be processed by the above-surface processing system 701, so that its non-transitory computer readable memory device 705 can generate at 306 two time-decay curves per each detector 205, 206, and 207: (a) one of thermal neutrons and another one of (b) gamma rays. As it is illustrated in FIG. 6A, FIG. 6B, and FIG. 6C, the time decay curves from the near detector 601, the middle detector 602, and the far detector 603 are similar but not exactly same. Specifically, the magnitude of signal is the highest from the near detector (FIG. 6A) and the lowest from the far detector (FIG. 6C), this is due to the fluence rate of thermal neutrons or capture gamma rays decreases with the distance from the source. Secondly, the slope of formation time decay is the steepest for the near detector and the lowest for the far detector. This is due to the thermal neutron diffusion effect has more impact on the decay curve for the near detector than for the far detector. The reason is that the higher the thermal neutron fluence rate is given by a higher diffusion effect that will be found on both thermal neutron time decay and capture gamma ray time decay. As it is observed in 601 and 603 the thermal neutron fluence rate is the highest at the near detector and the lowest at the far detector, respectively.

Using the pre-programmed non-transitory computer-readable memory device on an above-surface processing system 701, the time-decay curve of thermal neutrons is processed at 307 to generate at 308 for each of the at least three dual-function radiation detectors an apparent borehole time-decay constant which are assigned the following nomenclature one for each of the at least three dual-function radiation detector, depending upon their position (i.e. near, middle, and far) $\tau_{bnn}$, $\tau_{bnm}$, $\tau_{bnf}$. Similarly, using the processed time-decay curve of thermal neutrons 307, the pre-programmed non-transitory computer-readable memory device on an above-surface processing system generates at 309 for each of the at least three dual-function radiation detectors an apparent formation time-decay constant which are assigned the following nomenclature, depending upon their position (i.e., near, middle, and far) $\tau_{fnn}$, $\tau_{fnm}$, $\tau_{fnf}$. Thereafter, the pre-programmed non-transitory computer-readable memory device on an above-surface processing system, 701 will message the memory resource 703, to begin the storage of said apparent borehole time-decay constants and said apparent formation time-decay constants which, upon completion of said storing process, the pre-programmed non-transitory computer-readable memory device on an above-surface processing system, 701 will receive a message to begin computing at 310 the generated apparent borehole time-decay constant 308 with the generated apparent formation time-decay constant 309 for each of the at least three dual-function radiation detectors. Upon finalizing 310, the pre-programmed non-transitory computer-readable memory device on an above-surface processing system, 701 will trigger the generation at 311 of a neutron-induced borehole time-decay constant according to the following algorithm:

$$\tau_{bn} = f_1(\tau_{bnn}, \tau_{fnn}, \tau_{bnm}, \tau_{fnm}, \tau_{bnf}, \tau_{fnf}) \qquad (6)$$

Thereafter, the pre-programmed non-transitory computer-readable memory device on an above-surface processing system, 701 will message the memory resource 703, to begin the storage of said generated 311 borehole time-decay constant. Once the storage process is completed, the pre-programmed non-transitory computer-readable memory device on an above-surface processing system, 701 will trigger the generation at 312 of a neutron-induced formation time-decay constant according to the following algorithm:

$$\tau_{fn} = f_2(\tau_{bnn}, \tau_{fnn}, \tau_{bnm}, \tau_{fnm}, \tau_{bnf}, \tau_{fnf}) \qquad (7)$$

After successful completion of 312, the pre-programmed non-transitory computer-readable memory device on an above-surface processing system, 701 will message the memory resource 703, to begin the storage of said generated 312 neutron-induced formation time-decay constant, which upon successfully completing the storing process, it will signal the pre-programmed non-transitory computer-readable memory device on an above-surface processing system, 701 to display on computer system device 708 external monitor 710 the two aforementioned constants. Then, which could also be done in parallel, the pre-programmed non-transitory computer-readable memory device on an above-surface processing system, 701 will execute the processing the generated time-decay curve of neutron-induced thermal neutron capture gamma rays at 313, in order to generate at 314 apparent borehole time-decay constants rays for each of the at least three dual-function radiation detectors ($\tau_{bgn}$, $\tau_{bgm}$, $\tau_{bgf}$), as well as generate at 315 apparent formation time-decay constants ($\tau_{fgn}$, $\tau_{fgm}$, $\tau_{fgf}$). All said constants are assigned by the pre-programmed non-transitory computer-readable memory device on an above-surface processing system, 701 respective nomenclatures, depending upon the position (i.e., near, middle, and far) of the detectors within the BHA section 201.

Thereafter, the pre-programmed non-transitory computer-readable memory device on an above-surface processing system, 701 will message the memory resource 703, to begin the storage of said generated apparent borehole time-decay constants 314 and said generated apparent formation time-decay constants 315 which, upon completion of said storing process, the pre-programmed non-transitory computer-readable memory device on an above-surface processing system, 701 will receive a message to begin computing at 316 the generated apparent borehole time-decay constant 314 with the generated apparent formation time-decay constant 315 for each of the at least three dual-function radiation detectors. Upon finalizing 316, the pre-programmed non-transitory computer-readable memory device on the above-surface processing system, 701 will trigger the generation at 317 of a gamma-induced borehole time-decay constant according to the following algorithm:

$$\tau_{bg}=f_3(\tau_{bgn},\tau_{fgn},\tau_{bgm},\tau_{fgm},\tau_{bgf},\tau_{fgf}) \quad (7)$$

Thereafter, the pre-programmed non-transitory computer-readable memory device on an above-surface processing system, 701 will message the memory resource 703, to begin the storage of said generated 317 gamma-induced borehole time-decay constant. Once the storage process is completed, the pre-programmed non-transitory computer-readable memory device on an above-surface processing system, 701 will trigger the generation at 318 of a gamma-induced formation time-decay constant according to the following algorithm:

$$\tau_{fg}=f_4(\tau_{bgn},\tau_{fgn},\tau_{bgm},\tau_{fgm},\tau_{bgf},\tau_{fg,f}) \quad (7)$$

After successful completion of 318, the pre-programmed non-transitory computer-readable memory device on an above-surface processing system, 701 will message the memory resource 703, to begin the storage of said generated 317 gamma-induced formation time-decay constant, which upon successfully completing the storing process, it will signal the pre-programmed non-transitory computer-readable memory device on an above-surface processing system, 701 to display on computer system device 708 external monitor 710 the two aforementioned constants.

Then, using the pre-programmed non-transitory computer-readable memory device on an above-surface processing system 701 a neutron-induced borehole time-decay constant is processed at 319 with the gamma-induced borehole time-decay constant to generate at 320 a true borehole time-decay constant according to the following algorithm:

$$\tau_b=f_5(\tau_{bn},\tau_{bg}) \quad (10)$$

Similarly, using the pre-programmed non-transitory computer-readable memory device on an above-surface processing system 701 a neutron-induced formation time-decay constant is processed at 321 with the gamma-induced formation time-decay constant to generate, at 322, a true formation time-decay constant according to the following algorithm:

$$\tau_f=f_6(\tau_{fn},\tau_{fg}) \quad (11)$$

After successful completion of 320 and 322, the pre-programmed non-transitory computer-readable memory device on an above-surface processing system, 701 will message the memory resource 703, to begin the storage of said generated true borehole time-decay constant 320, and said generated true formation time-decay constant 322, which upon successfully completing the storing process, will signal the pre-programmed non-transitory computer-readable memory device on an above-surface processing system, 701 to display on computer system device 708 external monitor 710 the two aforementioned constants.

Notwithstanding the aforementioned, the pre-programmed non-transitory computer-readable memory device on an above-surface processing system 701 will receive a message hook from the memory resource 703, that all appropriate constants, data, and information has been stored, so that the pre-programmed non-transitory computer-readable memory device on an above-surface processing system 701 can begin computing a true borehole sigma at 323 in order to generate a true borehole sigma by the pre-programmed at 324 according to the following algorithm:

$$\Sigma_b = \frac{4.55 \times 10^3}{\tau_b} \quad (12)$$

Because of the computing processing power required by the application server 706 within the non-transitory computer readable memory device 705, the memory resource will receive a message from the pre-programmed non-transitory computer-readable memory device on an above-surface processing system 701 to begin storing by 703, the generated true borehole sigma from 324. After which, the memory resource device 703, will send another message hook to the pre-programmed non-transitory computer-readable memory device on an above-surface processing system 701, so that the non-transitory computer memory readable device 705 can begin computing a true formation sigma at 325 to generate a true formation sigma by the pre-programmed at 324 according to the following algorithm:

$$\Sigma_f = \frac{4.55 \times 10^3}{\tau_f} \quad (13)$$

Once step 325 is successfully complete, the memory resource device 703 will receive a message hook from the non-transitory computer readable memory device 705 that it can begin storing said true formation sigma, and upon successful storage, the memory device 703 will send the information, data, constants, variables, and sigmas to the computer system device 708 so that it can be display on 710 as well as printed using 713.

Figure 4A:
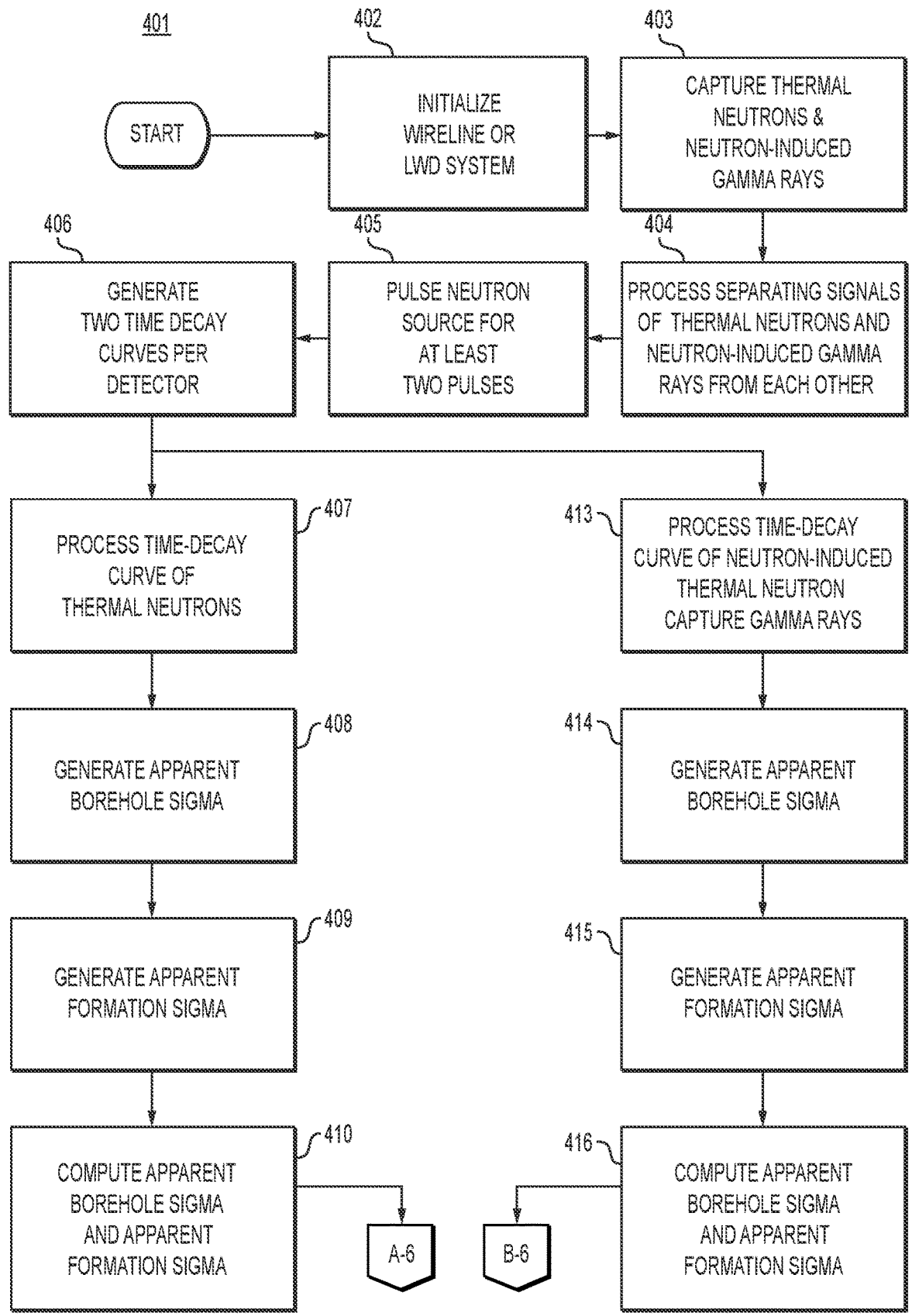
FIG. 4A, and FIG. 4B, illustrates a flow chart of the method routine of executing a computer program product for computing near-wellbore true borehole sigma using a neutron-induced borehole sigma with a generated gamma-induced borehole sigma, as well as computing a true formation sigma using a neutron-induced formation sigma with a generated gamma-induced formation sigma, according to an embodiment of the present disclosure.
Figure 4B:
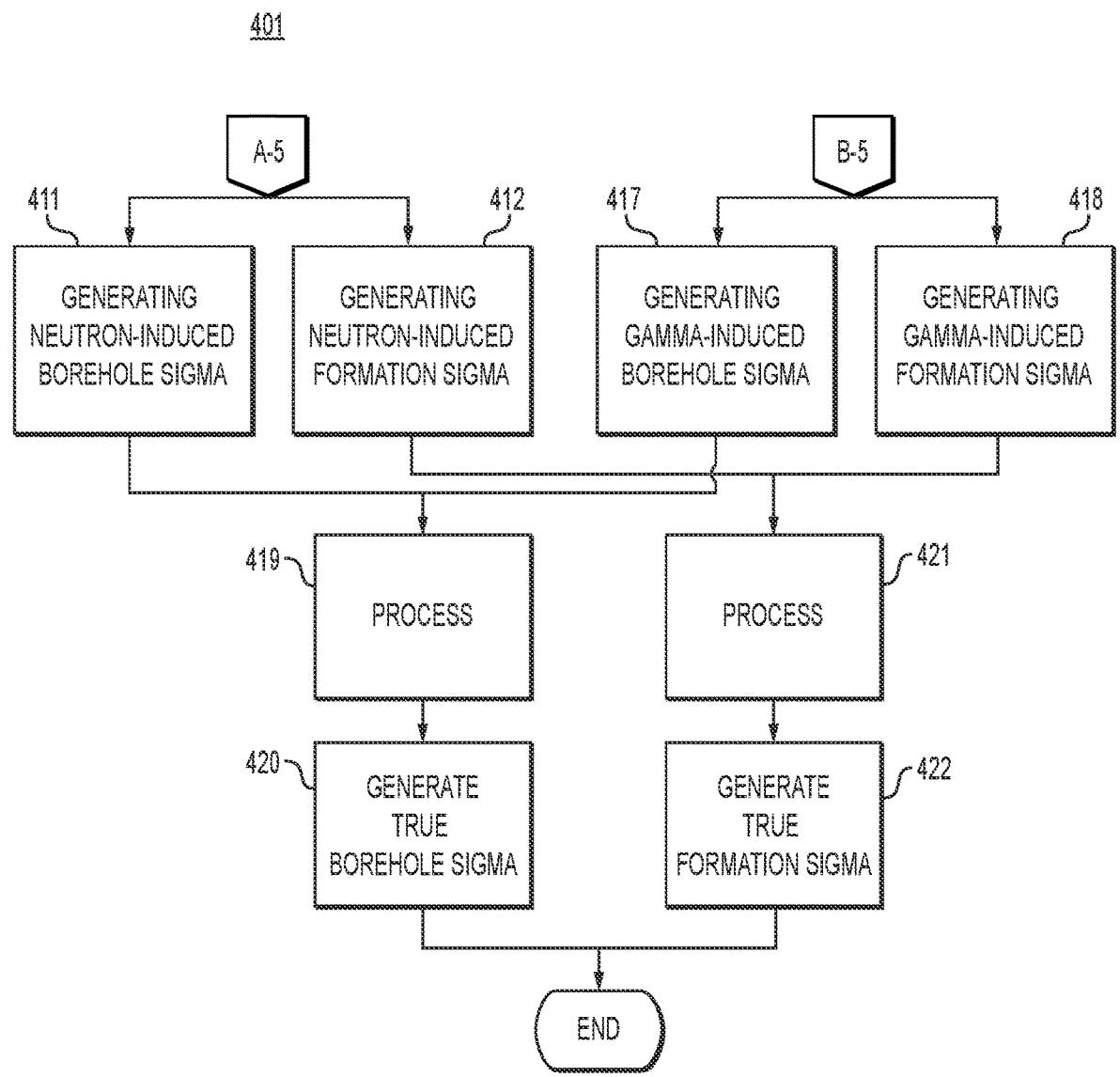

As it can be observed from FIGS. 4A, and 4B, a similar method as that illustrated in FIG. 3A and FIG. 3B is followed for obtaining a near-wellbore true borehole sigma and true formation sigma. Under method 401, one may obtain three pairs of apparent sigma from neutron time-decay at three detectors as well as get neutron-induced borehole sigma ($\Sigma_{bn}$) and neutron-induced formation sigma ($\Sigma_{fn}$) shown in algorithms 14 and 15. Similarly, one may obtain three pairs of apparent sigma from gamma ray time-decay at three detectors and get gamma-induced borehole sigma ($\Sigma_{bg}$) and gamma-induced formation sigma ($\Sigma_{fg}$) shown in algorithms (16) and (17). Then by combining said two borehole sigma ($\Sigma_{bn}$, $\Sigma_{bg}$) or two formation sigma ($\Sigma_{fn}$, $\Sigma_{fg}$) induced by both neutron decay and capture gamma ray decay, one can get the true borehole sigma ($\Sigma_b$) and the true formation sigma ($\Sigma_f$), in accordance to algorithms (18) and (19).

Said 401 which is also pre-programmed on both the on-board non-transitory computer readable memory device of the at least three dual-function radiation detectors, as well as on the pre-programmed non-transitory computer memory readable device of the above-surface processing system 701; begins when the wireline or LWD system 107 is initialized at 402 by a person having ordinary skills in the art, with a neuron pulse emitted by source 204 of at least 500 Hz and a pulse width of at least 20 microseconds. The thermal neutrons and neutron-induced gamma rays irradiated by the neuron pulse emitted by source 204, are then captured at 403, using the at least three dual-function radiation detectors 205, 206, and 207. Once all dual-function radiation detectors have captured the emitted thermal neutrons and neutron-induced gamma rays, at 404, the pre-programmed non-transitory computer readable memory device uses pulsed shape discrimination (PSD) technique to separate the signals of thermal neutron and neutron-induce gamma rays from each other. An exemplary separation output of the pre-programmed non-transitory computer readable memory device is illustrated in FIG. 5. The neutron source 204 then gets pulsed at 405 at least two more times and then the separated signals of neutrons and gamma rays from each detector are transmitted to the surface via the telemetry host system 212 to the telemetry client system 702 to be processed by the above-surface processing system 701, so that its non-transitory computer readable memory device 705 can generate at 406 two time-decay curves per each detector 205, 206, and 207: (a) one of thermal neutrons and another one of (b) gamma rays.

Using the pre-programmed non-transitory computer-readable memory device on an above-surface processing system 701, the time-decay curve of thermal neutrons is processed at 407 to generate at 408 for each of the at least three dual-function radiation detectors an apparent borehole sigma which are assigned the following nomenclature one for each of the at least three dual-function radiation detector, depending upon their position (i.e. near, middle, and far) $\Sigma_{bnn}$, $\Sigma_{bnm}$, $\Sigma_{bnf}$. Similarly, using the processed time-decay curve of thermal neutrons 407, the pre-programmed non-transitory computer-readable memory device on an above-surface processing system generates at 409 for each of the at least three dual-function radiation detectors an apparent formation sigma which are assigned the following nomenclature, depending upon their position (i.e., near, middle, and far) $\Sigma_{fnn}$, $\Sigma_{fnm}$, $\Sigma_{fnf}$. Thereafter, the pre-programmed non-transitory computer-readable memory device on an above-surface processing system, 701 will message the memory resource 703, to begin the storage of said apparent borehole sigma and said apparent formation sigma which, upon completion of said storing process, the pre-programmed non-transitory computer-readable memory device on an above-surface processing system, 701 will receive a message to begin computing at 410 the generated apparent borehole sigma 408 with the generated apparent formation sigma 409 for each of the at least three dual-function radiation detectors. Upon finalizing 410, the pre-programmed non-transitory computer-readable memory device on an above-surface processing system, 701 will trigger the generation at 411 of a neutron-induced borehole sigma according to the following algorithm:

$$\Sigma_{bn}=g_1(\Sigma_{bnn},\Sigma_{fnn},\Sigma_{bnm},\Sigma_{fnm},\Sigma_{bnf},\Sigma_{fnf}) \qquad (14)$$

Thereafter, the pre-programmed non-transitory computer-readable memory device on an above-surface processing system, 701 will message the memory resource 703, to begin the storage of said generated 411 neutron-induced borehole sigmas. Once the storage process is completed, the pre-programmed non-transitory computer-readable memory device on an above-surface processing system, 701 will trigger the generation at 412 of a neutron-induced formation sigma according to the following algorithm:

$$\Sigma_{fn}=g_2(\Sigma_{bnn},\Sigma_{fnn},\Sigma_{bnm},\Sigma_{fnm},\Sigma_{fnf}) \qquad (15)$$

After successful completion of 412, the pre-programmed non-transitory computer-readable memory device on an above-surface processing system, 701 will message the memory resource 703, to begin the storage of said generated 412 neutron-induced formation sigma according, which upon successfully completing the storing process, it will signal the pre-programmed non-transitory computer-readable memory device on an above-surface processing system, 701 to display on computer system device 708 external monitor 710 the two aforementioned sigmas. Then, which could also be done in parallel, the pre-programmed non-transitory computer-readable memory device on an above-surface processing system, 701 will execute the processing the generated time-decay curve of neutron-induced thermal neutron capture gamma rays at 413, in order to generate at 414 apparent borehole sigma for each of the at least three dual-function radiation detectors ($\Sigma_{bgn}$, $\Sigma_{bgm}$, $\Sigma_{bgf}$), as well as generate at 415 apparent formation sigma ($\Sigma_{fgn}$, $\Sigma_{fgm}$, $\Sigma_{fgf}$). All said sigmas are assigned by the pre-programmed non-transitory computer-readable memory device on an above-surface processing system, 701 respective nomenclatures, depending upon the position (i.e., near, middle, and far) of the detectors within the BHA section 201.

Thereafter, the pre-programmed non-transitory computer-readable memory device on an above-surface processing system, 701 will message the memory resource 703, to begin the storage of said generated apparent borehole sigma 414 and said generated apparent formation sigma 415 which, upon completion of said storing process, the pre-programmed non-transitory computer-readable memory device on an above-surface processing system, 701 will receive a message to begin computing at 416 generated apparent borehole sigma 314 with the generated apparent formation sigma 415 for each of the at least three dual-function radiation detectors. Upon finalizing 416, the pre-programmed non-transitory computer-readable memory device on the above-surface processing system, 701 will trigger the generation at 417 of a gamma-induced borehole sigma according to the following algorithm:

$$\Sigma_{bg}=g_3(\Sigma_{bgn},\Sigma_{fgn},\Sigma_{bgm},\Sigma_{fgm},\Sigma_{bgf},\Sigma_{fgf}) \qquad (16)$$

Thereafter, the pre-programmed non-transitory computer-readable memory device on an above-surface processing system, 701 will message the memory resource 703, to begin the storage of said generated 417 gamma-induced borehole sigma. Once the storage process is completed, the pre-programmed non-transitory computer-readable memory device on an above-surface processing system, 701 will trigger the generation at 418 of a gamma-induced formation sigma according to the following algorithm:

$$\Sigma_{fg}=g_4(\Sigma_{bgn},\Sigma_{fgn},\Sigma_{bgm},\Sigma_{fgm},\Sigma_{bgf},\Sigma_{fgf}) \qquad (17)$$

After successful completion of 418, the pre-programmed non-transitory computer-readable memory device on an above-surface processing system, 701 will message the memory resource 703, to begin the storage of said generated 417 gamma-induced formation sigma, which upon successfully completing the storing process, it will signal the pre-programmed non-transitory computer-readable memory device on an above-surface processing system, 701 to display on computer system device 708 external monitor 710 the two aforementioned sigmas.

Then, using the pre-programmed non-transitory computer-readable memory device on an above-surface processing system 701 the neutron-induced borehole sigma is processed at 419 with the gamma-induced borehole sigma to generate at 420 a true borehole sigma according to the following algorithm:

$$\Sigma_b = g_5(\Sigma_{bn}, \Sigma_{bg}) \quad (18)$$

Similarly, using the pre-programmed non-transitory computer-readable memory device on an above-surface processing system 701 a neutron-induced formation sigma is processed at 421 with the gamma-induced formation sigma to generate, at 422, a true formation sigma according to the following algorithm:

$$\Sigma_f = g_6(\Sigma_{fn}, \Sigma_{fg}) \quad (19)$$

After successful completion of 420 and 422, the pre-programmed non-transitory computer-readable memory device on an above-surface processing system, 701 will message the memory resource 703, to begin the storage of said generated true borehole sigma 420, and said generated true formation sigma 422; which upon successfully completing the storing process, will signal the pre-programmed non-transitory computer-readable memory device on an above-surface processing system, 701 to display on computer system device 708 external monitor 710 the two aforementioned sigmas. Thereafter, the memory resource device 703 will receive a message hook from the non-transitory computer readable memory device 705 that it can send the information, data, constants, variables, and sigmas to the computer system device 708 so that it can be display on 710 as well as printed using 713.

As it pertains to FIG. 5, it illustrates in graphical forms 501 how the pulse shape discrimination (PSD) technique that is pre-programmed in the non-transitory computer readable memory device of the at least three dual-function radiation detectors, are able separate between neutron and gamma rays. Particularly, by coupling and using two scintillators comprising $Cs_2LiYCl_6$ (CLYC) and $Cs_2LiLaBr_6$ (CLLB) crystals, which are sensitive to both neutrons and gamma rays to a scintillation-light-sensitive-component, such as a photomultiplier tube (PMT), the at least three dual-function radiation detectors can effectively detect both neutrons and gamma rays individually as an electronic signal from a gamma ray decays faster than a neutron, shown in 502 and 503.

On the other hand, FIG. 6A, FIG. 6B, and FIG. 6C illustrate a thermal neutron count rate decay curve, a neutron intensity, as well as a gamma ray count rate decay curve, for the near dual-function radiation detector 601, for the middle dual-function radiation detector 602, and for the far dual-function radiation detector 603, respectively. The frequency of neuron pulse used is of at least 500 Hz, with a pulse width of at least 40 microseconds for each of the three dual-function radiation detectors and represented by 601 (near detector), 602 (middle detector), and 603 (far detector). The thermal neutron count rate decay curve is illustrated for each of the at least three dual-function radiation detectors and represented by 601 (near detector), 602 (middle detector), and 603 (far detector). The capture gamma ray count rate decay curve from each of the three detectors is shown by 601 (near detector), 602 (middle detector), and 603 (far detector). Borehole decay dominates in the early time whereas formation decay dominates in the later time after each neutron pulse (during the time between neutron pulses).

Figure 7:
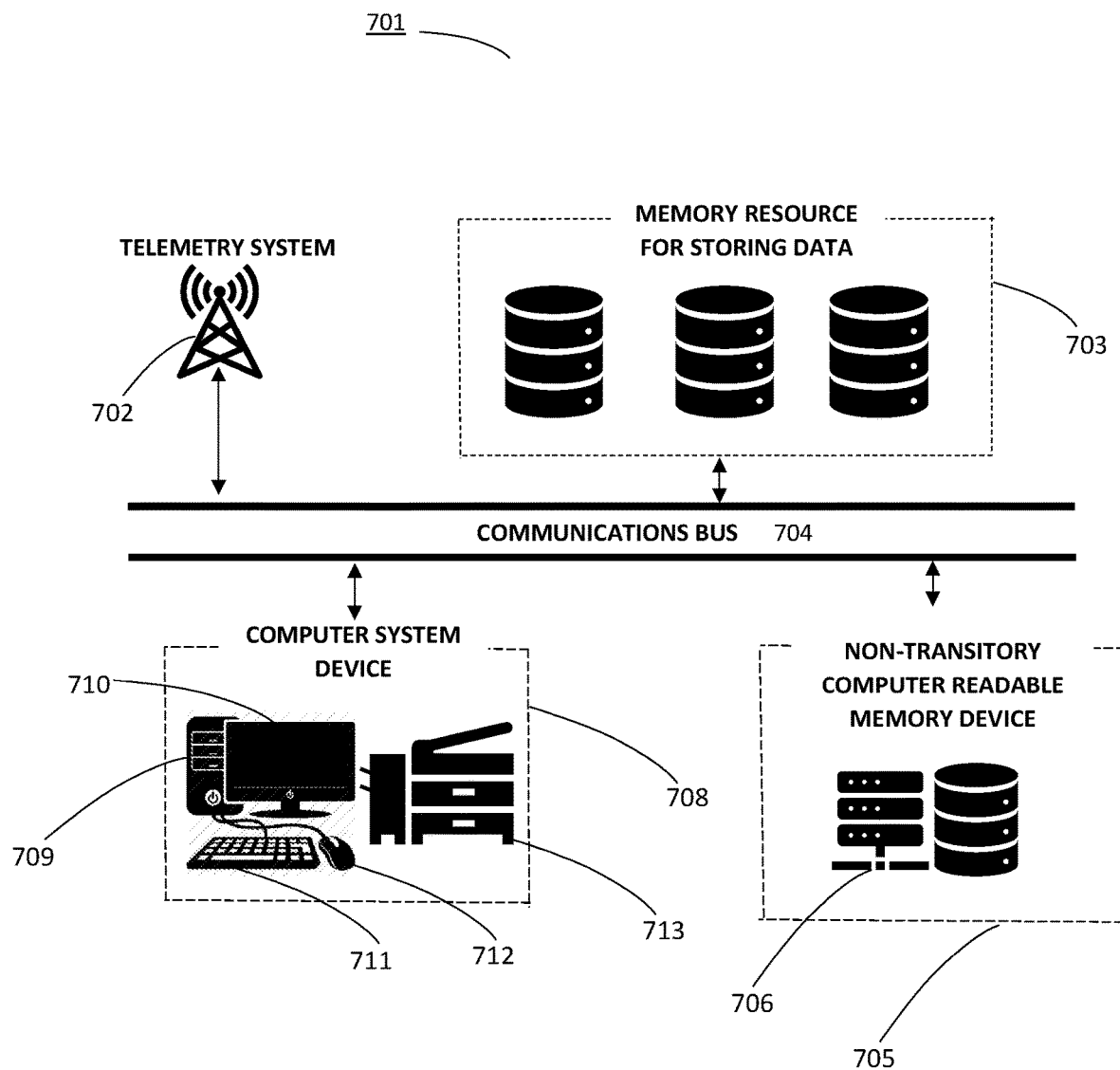
FIG. 7, is an electric diagram, in block form of an application server with a computing program product embodied in a non-transitory computer readable device, used in a distributed network to store instructions for performing, by a device, a method for obtaining near-wellbore true borehole sigma and true formation sigma by using a nuclear logging tool during oil and gas exploration, according to an embodiment of the present disclosure.

In fact, as it pertains to FIG. 7, the pre-programmed non-transitory computer-readable memory device on an above-surface processing system is part of a computing system device 701 which is shown to compile the information from the various application servers 706 that are placed within the above-surface processing system 110. Said pre-programmed non-transitory computer-readable memory device on an above-surface processing system 701 is shown typically comprising a telemetry system 702, a memory resource for storing data 703, a communication bus 704, an application server 706, and a computer system device that is used as a user-interface, 708. This pre-programmed non-transitory computer-readable memory device on an above-surface processing system 701, illustrated as a functional block diagram performs an array of operations and instructions for the method that uses pulsed neutron sources and multiple dual-function radiation detectors of neutrons and gamma rays that can be priorly distinguished using pulse shape discrimination techniques in order to measure thermal neutron time-decay signals and thermal neutron capture gamma ray time-decay signals to obtain borehole sigma and formation sigma.

The memory resource 703 may include any of various forms of memory media and memory access devices. For example, memory devices 703 may include semiconductor RAM and ROM devices as well as mass storage devices such as CD-ROM drives, magnetic disk drives, and magnetic tape drives.

The computer system device, 708, acts as a user interface the non-transitory computer readable device, 705 of the application server 706 to input, set, setup, select, and perform the operations of extracting, storing, processing, computing, generating, retrieving, interpolating, and repeating, (collectively the message hook procedures). Said computer system device, 708, is connected to (wired and/or wirelessly) through a communication device 704 to the above surface telemetry system 702, to the memory resource 703, and to the non-transitory computer readable memory device 705. The computer system device, 508, further includes other devices like a central processing unit (CPU), 709, a display or monitor, 710, a keyboard, 711, a mouse, 712, and a printer, 713. One or more users may supply input to the pre-programmed non-transitory computer-readable memory device on an above-surface processing system 701 through the set of input devices of the computing system 708 like 711 or 712. Nevertheless, a person having ordinary skills in the art will soon realize that input devices may also include devices such as digitizing pads, track balls, light pens, data gloves, eye orientation sensors, head orientation sensors, etc. The set of output devices 710 and 713 may also include devices such as projectors, head-mounted displays, plotters, etc.

In one embodiment of the pre-programmed non-transitory computer-readable memory device on an above-surface processing system 701, it may include one or more communication devices (communications bus) 704, like network interface cards for interfacing with a computer network. For example, seismic data gathered at a remote site or below surface, may be transmitted to the pre-programmed non-transitory computer-readable memory device on an above-surface processing system 701 using a telemetry system 702, through a computer network. The pre-programmed non-transitory computer-readable memory device on an above-surface processing system 701 may also receive seismic data, coordinates, elements, source, and receiver information from an external computer network using the communication's bus 704 network interface card, in addition to that data received from the wireline or LWD tool 107. In other embodiments, the pre-programmed non-transitory computer-readable memory device on an above-surface processing system 701 may include a plurality of computers and/or other components coupled over a computer network, where storage and/or computation implementing embodiments of the present may be distributed over the computers (and/or components) as desired.

The pre-programmed non-transitory computer-readable memory device on an above-surface processing system 701, has a firmware, a kernel and a software providing for the connection and interoperability of the multiple connected devices, like the telemetry system 702, the memory resources for storing data, 703, the communication bus 704, the non-transitory computer readable device, 706, and the computer system device, 708. The pre-programmed non-transitory computer-readable memory device on an above-surface processing system 701, includes an operating system, a set of message hook procedures, and a system application.

Furthermore, because performance and computation costs are always an important issue, the pre-programmed non-transitory computer-readable memory device on an above-surface processing system 701, uses the non-transitory computer readable device, 705 to ensure that the steps of the methods 301 and 401 will not be bottlenecked by all its I/O, or any other network communications. In fact, file-distribution systems like Apache Hadoop in combination with proper data-compressions, as well as smart file caching according to the data will ensure that the operations or instructions performed at 301 and 401, as shown on of FIG. 3A, FIG. 3B, FIG. 4A, and FIG. 4B; are only limited by the memory/cache speed and CPU/GPU computing power, and nothing else.

The operating system embedded within the pre-programmed non-transitory computer-readable memory device on an above-surface processing system 701, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of the pre-programmed non-transitory computer-readable memory device on an above-surface processing system 701 may, for example, represent an operation or command of the memory resources, 703, the computer system device, 708, the non-transitory computer readable device, 706, which may be currently executing a certain step process or subroutines from method 301 and 401, as shown on of FIG. 3A, FIG. 3B, FIG. 4A, and FIG. 4B.

The set of message hook procedures may be first initiated by: (i) an input from a user, which will typically be a person having ordinary skills in the art, like the entering of user-defined values or parameters; (ii) the manipulation of the computer system device, 708; (iii) the processing of operations in the non-transitory computer readable memory device, 705; or (iv) automatically once certain data has been stored or retrieved by either the memory resources, 703, or the non-transitory computer readable memory device, 705. Based on any of these inputs, processes or manipulation events, the memory resource, 703, the non-transitory computer readable memory device, 705, or the computer system device, 708; generate a data packet that is passed using the communication bus, 704, which are indicative of the event that has occurred as well as the event that needs to occur. When either the memory resource, 703, the non-transitory computer readable device, 705, or the computer system device, 708, receive the data packet, they convert it into a message based on the event, and executes the required operations or instruction of 301 or 401. This is achieved when the operating system examines the message hook list and determines if any message hook procedures have registered themselves with the operating system before. If at least one message hook procedure has registered itself with the operating system, the operating system passes the message via the communication bus 704 to the registered message hook procedure that appears first on the list. The called message hook executes and returns a value to either the memory resource, 703, the non-transitory computer readable memory device, 705, or the computer system device, 708, instructing them, to pass the message to the next registered message hook, and either the memory resource, 703, the non-transitory computer readable memory device, 705, or the computer system device, 705. The pre-programmed non-transitory computer-readable memory device on an above-surface processing system 701, continues executing the operations until all registered message hooks have passed, which indicates the completion of the operations or instruction 301 or 401, by the generation and storing of a set of final spatial varying wavelets, to the memory resource, 703.

The non-transitory computer readable device, 705, is configured to read and execute program instructions, e.g., program instructions provided on a memory medium such as a set of one or more CD-ROMs and loaded into semiconductor memory at execution time. The non-transitory computer readable device, 705 may be coupled wired or wireless to memory resource 703 through the communication bus 704 (or through a collection of busses). In response to the program instructions, the non-transitory computer readable memory device, 705 may operate on data stored in one or more memory resource 703. The non-transitory computer readable memory device, 703 may include one or more programmable processors (e.g., microprocessors).

A "pre-programmed non-transitory computer-readable memory device on an above-surface processing system" or a "computer program product or computing system device" includes the direct act that causes generating, as well as any indirect act that facilitates generation. Indirect acts include providing software to a user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, an LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a retrieving system and are thus envisioned by the invention as possible equivalent structures and equivalent methods.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

According to the preferred embodiment of the present invention, certain hardware, and software descriptions were detailed, merely as example embodiments and are not to limit the structure of implementation of the disclosed embodiments. For example, although many internal, and external components have been described, those with ordinary skills in the art will appreciate that such components and their interconnection are well known. Additionally, certain aspects of the disclosed invention may be embodied in software that is executed using one or more, receiving systems, computers systems devices, or non-transitory computer readable memory devices. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

It is to be noted that, as used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

Also, the term "computing" encompasses a wide variety of actions, including calculating, determining, processing, deriving, investigation, look ups (e.g., looking up in a table, a database, or another data structure), ascertaining and the like. It may also include receiving (e.g. receiving information), accessing (e.g. accessing data in a memory) and the like. "Computing" may include executing, resolving, selecting, choosing, establishing, and the like. On the other hand, the term "generating" encompasses the actions of outputting a certain constant or sigma, variable such as borehole constant, formation constant, borehole sigma, or formation sigma.

Capturing certain data may include creating or distributing the referenced data to the subject by physical, telephonic, or electronic delivery, providing access over a network to the referenced data, or creating or distributing software to the subject configured to run on the subject's workstation or computer including the reference image. In one example, acquiring of a referenced data or information could involve enabling the subject to obtain the referenced data or information in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Some embodiments of the invention relate to methods of using dual-function radiation detectors to monitor the radiation output of the pulsed neutron generator. Methods of the invention may further include correcting (also referred to as neutron-induced) the monitor detector count rates for environmental effects (mainly lithology, porosity, and standoff), yielding a compensated (corrected, neutron-induced) monitor of source strength. The corrected constant, variable, or sigma can then be used to compensate other detector measurements for source strength variations that arise from, for example, imperfections in the pulse neutron generator, power fluctuations, etc. The resulting source-compensated measurements can then provide an improved accuracy in formation logging.

Other embodiments of the invention relate to function that can be any algorithmic function with multiple variables in any order, for example, the function $f$ or the function $g$ with two variables can be a polynomial function in second order, such as:

$$f(x,y) = a_{2,0}x^2 + a_{1,1}xy + a_{0,2}y^2 + a_{1,0}x + a_{0,1} + a_{0,0} \qquad (20)$$

Where $a_{2,0}$, $a_{1,1}$, $a_{0,2}$, $a_{1,0}$, $a_{0,1}$, and $a_{0,0}$ are coefficients. Similarly, another embodiment of the present disclosure can be achieved by utilizing the following algorithmic expression for all sigmas, as well as constants (by replacing $\Sigma$ with $\tau$):

a) For neutron-induced borehole sigma:

$$\Sigma_{bn} = g_1(\Sigma_{bnn}, \Sigma_{fnn}, \Sigma_{bnm}, \Sigma_{fnm}, \Sigma_{bnf}, \Sigma_{fnf}) = \qquad (21)$$
$$a_0 + a_1\Sigma_{bnn} + a_2\Sigma_{bnm} + a_3\Sigma_{bnf} + a_4\Sigma_{fnn} + a_5\Sigma_{fnm} + a_6\Sigma_{fnf} + a_7\Sigma_{bnn}^2 +$$
$$a_8\Sigma_{bnm}^2 + a_9\Sigma_{bnf}^2 + a_{10}\Sigma_{fnn}^2 + a_{11}\Sigma_{fnm}^2 + a_{12}\Sigma_{fnf}^2 + a_{13}\Sigma_{bnn}\Sigma_{bnm} +$$
$$a_{14}\Sigma_{bnn}\Sigma_{bnf} + a_{15}\Sigma_{bnm}\Sigma_{bnf} + a_{16}\Sigma_{fnn}\Sigma_{fnm} + a_{17}\Sigma_{fnn}\Sigma_{fnf} + a_{18}\Sigma_{fnm}\Sigma_{fnf} +$$
$$a_{19}\Sigma_{bnn}\Sigma_{fnn} + a_{20}\Sigma_{bnm}\Sigma_{fnm} + a_{21}\Sigma_{bnf}\Sigma_{fnf} + a_{22}\Sigma_{bnn}\Sigma_{fnm} +$$
$$a_{23}\Sigma_{bnn}\Sigma_{fnf} + a_{24}\Sigma_{bnm}\Sigma_{fnn} + a_{25}\Sigma_{bnm}\Sigma_{fnf} + a_{26}\Sigma_{bnf}\Sigma_{fnn} + a_{27}\Sigma_{bnf}\Sigma_{fnm}$$

b) For neutron-induced formation sigma:

$$\Sigma_{fn} = g_2(\Sigma_{bnn}, \Sigma_{fnn}, \Sigma_{bnm}, \Sigma_{fnm}, \Sigma_{bnf}, \Sigma_{fnf}) = \quad (22)$$

$$b_0 + b_1\Sigma_{fnn} + b_2\Sigma_{fnm} + b_3\Sigma_{fnf} + a_4\Sigma_{bnn} + b_5\Sigma_{bnm} + b_6\Sigma_{bnf} + b_7\Sigma_{fnn}^2 +$$

$$b_8\Sigma_{fnm}^2 + b_9\Sigma_{fnf}^2 + b_{10}\Sigma_{bnn}^2 + b_{11}\Sigma_{bnm}^2 + b_{12}\Sigma_{bnf}^2 + b_{13}\Sigma_{fnn}\Sigma_{fnm} +$$

$$b_{14}\Sigma_{fnn}\Sigma_{fnf} + b_{15}\Sigma_{fnm}\Sigma_{fnf} + b_{16}\Sigma_{bnn}\Sigma_{fnn} + b_{17}\Sigma_{bnm}\Sigma_{fnm}b_{18}\Sigma_{bnf}\Sigma_{fnf} +$$

$$b_{19}\Sigma_{bnn}\Sigma_{fnm} + b_{20}\Sigma_{bnn}\Sigma_{fnf} + b_{21}\Sigma_{bnm}\Sigma_{fnn} + b_{22}\Sigma_{bnm}\Sigma_{fnf} +$$

$$b_{23}\Sigma_{bnf}\Sigma_{fnn} + b_{24}\Sigma_{bnf}\Sigma_{fnm} + b_{25}\Sigma_{bnn}\Sigma_{bnm} + b_{26}\Sigma_{bnn}\Sigma_{bnf} + b_{27}\Sigma_{bnm}\Sigma_{bnf}$$

c) For gamma-induced borehole sigma:

$$\Sigma_{bg} = g_3(\Sigma_{bgn}, \Sigma_{fgn}, \Sigma_{bgm}, \Sigma_{fgm}, \Sigma_{bgf}, \Sigma_{fgf}) = \quad (23)$$

$$c_0 + c_1\Sigma_{bgn} + c_2\Sigma_{bgm} + c_3\Sigma_{bgf} + c_4\Sigma_{fgn} + c_5\Sigma_{fgm} + c_6\Sigma_{fgf} + c_7\Sigma_{bgn}^2 +$$

$$c_8\Sigma_{bgm}^2 + c_9\Sigma_{bgf}^2 + c_{10}\Sigma_{fgn}^2 + c_{11}\Sigma_{fgm}^2 + c_{12}\Sigma_{fgf}^2 + c_{13}\Sigma_{bgn}\Sigma_{bgm} +$$

$$c_{14}\Sigma_{bgn}\Sigma_{bnf} + c_{15}\Sigma_{bgm}\Sigma_{bgf} + c_{16}\Sigma_{fgn}\Sigma_{fgm} + c_{17}\Sigma_{fgn}\Sigma_{fnf} + c_{18}\Sigma_{fgm}\Sigma_{fnf} +$$

$$c_{19}\Sigma_{bgn}\Sigma_{fgn} + c_{20}\Sigma_{bgm}\Sigma_{fgm} + c_{21}\Sigma_{bgf}\Sigma_{fgf} + c_{22}\Sigma_{bgn}\Sigma_{fgm} +$$

$$c_{23}\Sigma_{bgn}\Sigma_{fnf} + c_{24}\Sigma_{bgm}\Sigma_{fgn} + c_{25}\Sigma_{bgm}\Sigma_{fgf} + c_{26}\Sigma_{bnf}\Sigma_{fgn} + c_{27}\Sigma_{bgf}\Sigma_{fgm}$$

d) For gamma-induced formation sigma:

$$\Sigma_{fg} = \quad (24)$$

$$g_4(\Sigma_{bgn}, \Sigma_{fgn}, \Sigma_{bgm}, \Sigma_{fgm}, \Sigma_{bgf}, \Sigma_{fgf})d_0 + d_1\Sigma_{fgn} + d_2\Sigma_{fgm} + d_3\Sigma_{fgf} +$$

$$d_4\Sigma_{bgn} + d_5\Sigma_{bgm} + d_6\Sigma_{bgf} + d_7\Sigma_{fgn}^2 d_8\Sigma_{fgm}^2 + d_9\Sigma_{fgf}^2 d_{10}\Sigma_{bgn}^2 d_{11}\Sigma_{bgm}^2 +$$

$$d_{12}\Sigma_{bgf}^2 + d_{13}\Sigma_{fgn}\Sigma_{fgm} + d_{14}\Sigma_{fgn}\Sigma_{fgf} d_{15}\Sigma_{fgm}\Sigma_{fgf} +$$

$$d_{16}\Sigma_{bgn}\Sigma_{fgn} + d_{17}\Sigma_{bgm}\Sigma_{fgm} + d_{18}\Sigma_{bgf}\Sigma_{fgf} d_{19}\Sigma_{bgn}\Sigma_{fgm} +$$

$$d_{20}\Sigma_{bgn}\Sigma_{fgf} + d_{21}\Sigma_{bgm}\Sigma_{fgn} + d_{22}\Sigma_{bgm}\Sigma_{fgf} d_{23}\Sigma_{bgf}\Sigma_{fgn} +$$

$$d_{24}\Sigma_{bgf}\Sigma_{fgm} + d_{25}\Sigma_{bgn}\Sigma_{bgm} + d_{26}\Sigma_{bgn}\Sigma_{bgf} + d_{27}\Sigma_{bgm}\Sigma_{bgf}$$

e) For true borehole sigma:

$$\Sigma_b = g_5(\Sigma_{bn}, \Sigma_{bg}) = e_0 + e_1\Sigma_{bn} + e_2\Sigma_{bg} + a_3\Sigma_{bn}\Sigma_{bg} + a_4\Sigma_{bn}^2 + a_5\Sigma_{bg}^2 \quad (25)$$

f) For true formation sigma:

$$\Sigma_f = g_6(\Sigma_{fn}, \Sigma_{fg}) = h_0 + h_1\Sigma_{bn} + h_2\Sigma_{bg} + h_3\Sigma_{bn}\Sigma_{bg} + h_4\Sigma_{bn}^2 + h_5\Sigma_{bg}^2 \quad (26)$$

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

Symbols Table

| Symbol | Brief Definition |
|---|---|
| $\Sigma_b$ | true macroscopic thermal neutron capture cross-section (sigma) of borehole |
| $\Sigma_f$ | true macroscopic thermal neutron capture cross-section (sigma) of formation |
| v | thermal neutron speed |
| B | background count rate |
| σ | thermal neutron capture cross-section |
| ρ | density of material |
| $N_A$ | Avogadro number |
| A | atomic weight of an element |
| C(t) | count rate of detector at time t |
| $\Sigma_{bnn}$ | apparent borehole sigma obtained from neutron decay of the near detector |
| $\Sigma_{fnn}$ | apparent formation sigma obtained from neutron decay of the near detector |
| $\Sigma_{bnm}$ | apparent borehole sigma obtained from neutron decay of the middle detector |
| $\Sigma_{fnm}$ | apparent formation sigma obtained from neutron decay of the middle detector |
| $\Sigma_{bnf}$ | apparent borehole sigma obtained from neutron decay of the far detector |
| $\Sigma_{fnf}$ | apparent formation sigma obtained from neutron decay of the far detector |
| $\Sigma_{bn}$ | neutron-induced borehole sigma |
| $\Sigma_{bg}$ | gamma-induced borehole sigma |
| $\tau_{bnn}$ | apparent borehole neutron mean lifetime obtained from neutron decay of the near detector |
| $\tau_{fnn}$ | apparent formation neutron mean lifetime obtained from neutron decay of the near detector |
| $\tau_{bnm}$ | apparent borehole neutron mean lifetime obtained from neutron decay of the middle detector |
| $\tau_{fnm}$ | apparent formation neutron mean lifetime obtained from neutron decay of the middle detector |
| $\tau_{bnf}$ | apparent borehole neutron mean lifetime obtained from neutron decay of the far detector |
| $\tau_{fnf}$ | apparent formation neutron mean lifetime obtained from neutron decay of the far detector |
| $\tau_{bn}$ | neutron-induced borehole time-decay constant |
| $\tau_{bg}$ | gamma-induced borehole time-decay constant |
| t | time |
| c.u. | capture unit, 1/1000 of 1/cm |
| R | universal gas constant |
| M | molecular weight of neutron |
| $v_p$ | the most probable speed of neutrons |
| K | kinetic energy of neutron |
| $\Sigma_{bnn}$ | apparent borehole sigma obtained from neutron decay of the near detector |
| $\Sigma_{fnn}$ | apparent formation sigma obtained from neutron decay of the near detector |
| $\Sigma_{bnm}$ | apparent borehole sigma obtained from neutron decay of the middle detector |
| $\Sigma_{bgf}$ | apparent borehole sigma obtained from gamma ray decay of the far detector |

-continued

Symbols Table

| Symbol | Brief Definition |
|---|---|
| $\Sigma_{fgf}$ | apparent formation sigma obtained from gamma ray decay of the far detector |
| $\Sigma_{bgn}$ | apparent borehole sigma obtained from gamma ray decay of the near detector |
| $\Sigma_{fgn}$ | apparent formation sigma obtained from gamma ray decay of the near detector |
| $\Sigma_{bgm}$ | apparent borehole sigma obtained from gamma ray decay of the middle detector |
| $\Sigma_{fgm}$ | apparent formation sigma obtained from gamma ray decay of the middle detector |
| $\Sigma_{fn}$ | neutron-induced formation sigma |
| $\Sigma_{fn}$ | gamma-induced formation sigma |
| $\tau_{bgn}$ | apparent borehole neutron mean lifetime obtained from gamma ray decay of the near detector |
| $\tau_{fgn}$ | apparent formation neutron mean lifetime obtained from gamma ray decay of the near detector |
| $\tau_{bgm}$ | apparent borehole neutron mean lifetime obtained from gamma ray decay of the middle detector |
| $\tau_{fgm}$ | apparent formation neutron mean lifetime obtained from gamma ray decay of the middle detector |
| $\tau_{bgf}$ | apparent borehole neutron mean lifetime obtained from gamma ray decay of the far detector |
| $\tau_{fgf}$ | apparent formation neutron mean lifetime obtained from gamma ray decay of the far detector |
| $\tau_{fn}$ | neutron-induced formation time-decay constant |
| $\tau_{fg}$ | gamma-induced formation time-decay constant |

What is claimed is:

1. A method for obtaining near-wellbore true borehole sigma and true formation sigma by using a nuclear logging tool during oil and gas exploration having a pulsed neutron source coupled with at least three dual-function radiation detectors, high-voltage suppliers and an electronic instrument having non-transitory computer readable memory device for performing the operations of processing, generating, and computing, the method comprising:

initializing a wireline or logging-while-drilling system within a borehole in an earth formation having a nuclear logging tool for detecting and processing thermal neutrons and neutron-induced gamma rays comprising, a pulsed neutron source from a neutron generator operated at a neuron pulse of at least 500 Hz and a pulse width of at least 20 microseconds, at least three dual-function radiation detectors wherein each dual-function radiation detector is pre-programmed through a non-transitory computer-readable memory device using pulsed shape discrimination technique;

capturing thermal neutrons and neutron-induced gamma rays, using the at least three dual-function radiation detectors;

processing the captured thermal neutrons and neutron-induced gamma rays, using the pre-programmed non-transitory computer-readable memory device for separating signals of thermal neutrons and neutron-induced gamma rays from each other;

pulsing the neutron source for at least two pulses;

generating two time-decay curves for each of the at least three dual-function radiation detectors by a pre-programmed non-transitory computer-readable memory device on an above-surface processing system, using the processed thermal neutrons and neutron-induced gamma rays immediately after the first pulse from the neutron source and before the second pulse from the neutron source, wherein said time-decay curves being one of thermal neutrons and one of neutron-induced thermal neutron capture gamma rays;

processing the generated time-decay curve of thermal neutrons by the pre-programmed non-transitory computer-readable memory device on an above-surface processing system, to obtain a neutron-induced borehole time-decay constant and a neutron-induced formation time-decay constant for each of the at least three dual-function radiation detectors;

generating an apparent borehole time-decay constant by the pre-programmed non-transitory computer-readable memory device on an above-surface processing system, using the processed time-decay curve of thermal neutrons for each of the at least three dual-function radiation detectors;

generating an apparent formation time-decay constant by the pre-programmed non-transitory computer-readable memory device on an above-surface processing system, using the processed time-decay curve of thermal neutrons for each of the at least three dual-function radiation detectors;

computing the generated apparent borehole time-decay constant for each of the at least three dual-function radiation detectors with the generated apparent formation time-decay constant for each of the at least three dual-function radiation detectors, using the pre-programmed non-transitory computer-readable memory device on an above-surface processing system;

generating a neutron-induced borehole time-decay constant by the pre-programmed non-transitory computer-readable memory device on an above-surface processing system using the computed apparent borehole time-decay constant and the computed apparent formation time-decay constant of each of the at least three dual-function radiation detectors;

generating a neutron-induced formation time-decay constant by the pre-programmed non-transitory computer-readable memory device on an above-surface processing system using the computed apparent borehole time-decay constant and the computed apparent formation time-decay constant of each of the at least three dual-function radiation detectors;

processing the generated time-decay curve of neutron-induced thermal neutron capture gamma rays using the pre-programmed non-transitory computer-readable memory device on an above-surface processing system to obtain a gamma-induced borehole time-decay constant and a gamma-induced formation time-decay constant for each of the at least three dual-function radiation detectors;

generating an apparent borehole time-decay constant by the pre-programmed non-transitory computer-readable memory device on an above-surface processing system, using the processed time-decay curve of neutron-induced thermal neutron capture gamma rays for each of the at least three dual-function radiation detectors;

generating an apparent formation time-decay constant by the pre-programmed non-transitory computer-readable memory device on an above-surface processing system, using the processed time-decay curve of neutron-induced thermal neutron capture gamma rays for each of the at least three dual-function radiation detectors;

computing the generated apparent borehole time-decay constant for each of the at least three dual-function radiation detectors with the generated apparent formation time-decay constant for each of the at least three dual-function radiation detectors, using the pre-programmed non-transitory computer-readable memory device on an above-surface processing system;

generating a gamma-induced borehole time-decay constant by the pre-programmed non-transitory computer-readable memory device on an above-surface processing system, using the computed apparent borehole time-decay constant and the computed apparent formation time-decay constant of each of the at least three dual-function radiation detectors;

generating a gamma-induced formation time-decay constant by the pre-programmed non-transitory computer-readable memory device on an above-surface processing system, using the computed apparent borehole time-decay constant and the computed apparent formation time-decay constant of each of the at least three dual-function radiation detectors;

processing the generated neutron-induced borehole time-decay constant with the gamma-induced borehole time-decay constant for each of the at least three dual-function radiation detectors, using the pre-programmed non-transitory computer-readable memory device on an above-surface processing system;

generating a true borehole time-decay constant by the pre-programmed non-transitory computer-readable memory device on an above-surface processing system, using the generated neutron-induced borehole time-decay constant with the generated gamma-induced borehole time-decay constant;

processing the generated neutron-induced formation time-decay constant by the pre-programmed non-transitory computer-readable memory device on an above-surface processing system, with the generated gamma-induced formation time-decay constant for each of the at least three dual-function radiation detectors, using the pre-programmed non-transitory computer-readable memory device;

generating a true formation time-decay constant by the pre-programmed non-transitory computer-readable memory device on an above-surface processing system, using the generated neutron-induced formation time-decay constant with the generated gamma-induced formation time-decay constant;

computing a true borehole sigma by the pre-programmed non-transitory computer-readable memory device on an above-surface processing system, using the generated true borehole time-decay constant, using the pre-programmed non-transitory computer-readable memory device;

generating a true borehole sigma by the pre-programmed non-transitory computer-readable memory device on an above-surface processing system, from the computed true borehole sigma;

computing a true formation sigma by the pre-programmed non-transitory computer-readable memory device on an above-surface processing system, using the generated true formation time-decay constant, using the pre-programmed non-transitory computer-readable memory device; and generating a true formation sigma by the pre-programmed non-transitory computer-readable memory device on an above-surface processing system, from the computed true formation sigma.

2. The method of claim 1, wherein the wireline or logging-while-drilling system further comprises of a telemetry system for transmitting information to an above-surface processing system, and a mud channel filled with flowing drilling mud.

3. The method of claim 1, wherein the by the pre-programmed non-transitory computer-readable memory device on an above-surface processing system is further coupled to a computer system device, a non-transitory computer readable memory device, an above-surface telemetry system, and a memory device.

4. The method of claim 1, wherein the pulsed neutron source further comprises of at least a deuterium-tritium (D-T) neutron generator or a deuterium-deuterium (D-D) neutron generator.

5. The method of claim 1, wherein the at least three dual-function radiation detectors are disposed at same or different longitudinal directions inside the wireline or logging-while-drilling system having the pre-programmed non-transitory computer memory readable device to detect and separate characteristics of neutrons and gamma rays.

6. The method of claim 1, wherein the pre-programmed non-transitory computer-readable memory device on an above-surface further stores a computer program comprising program code instructions which can be loaded in a programmable device to cause said programmable device to implement the instructions according to claim 1, when said program is executed by an application server of said device, coupled through a communication bus to a memory resource.

7. The method of claim 1, wherein generating a neutron-induced borehole time-decay constant by the pre-programmed non-transitory computer-readable memory device on an above-surface processing system using the computed apparent borehole time-decay constant and the computed apparent formation time-decay constant of each of the at least three dual-function radiation detectors further comprises the expression:

$$\tau_{bn}=f_1(\tau_{bnn},\tau_{fnn},\tau_{bnm},\tau_{fnm},\tau_{bnf},\tau_{fnf}).$$

8. The method of claim 1, wherein generating a neutron-induced formation time-decay constant by the pre-programmed non-transitory computer-readable memory device on an above-surface processing system using the computed apparent borehole time-decay constant and the computed apparent formation time-decay constant of each of the at least three dual-function radiation detectors further comprises the expression:

$$\tau_{fn}=f_2(\tau_{bnn},\tau_{fnn},\tau_{bnm},\tau_{fnm},\tau_{bnf},\tau_{fnf}).$$

9. The method of claim 1, wherein generating a gamma-induced borehole time-decay constant by the pre-programmed non-transitory computer-readable memory device on an above-surface processing system, using the computed apparent borehole time-decay constant and the computed apparent formation time-decay constant of each of the at least three dual-function radiation detectors further comprises the expression:

$$\tau_{bg}=f_3(\tau_{bgn},\tau_{fgn},\tau_{bgm},\tau_{fgm},\tau_{bgf},\tau_{fgf}).$$

10. The method of claim 1, wherein
generating a gamma-induced formation time-decay constant by the pre-programmed non-transitory computer-readable memory device on an above-surface processing system, using the computed apparent borehole time-decay constant and the computed apparent formation time-decay constant of each of the at least three dual-function radiation detectors further comprises the expression:

$\tau_{fg}=f_4(\tau_{bgn},\tau_{fgn},\tau_{bgm},\tau_{fgm},\tau_{bgf},\tau_{fg,f})$.

11. The method of claim 1, wherein
generating a true borehole time-decay constant by the pre-programmed non-transitory computer-readable memory device on an above-surface processing system, using the generated neutron-induced borehole time-decay constant with the generated gamma-induced borehole time-decay constant further comprises the expression:

$\tau_b=f_5(\tau_{bn},\tau_{bg})$.

12. The method of claim 1, wherein
generating a true formation time-decay constant by the pre-programmed non-transitory computer-readable memory device on an above-surface processing system, using the generated neutron-induced formation time-decay constant with the generated gamma-induced formation time-decay constant further comprises the expression:

$\tau_f=f_6(\tau_{fn},\tau_{fg})$.

13. The method of claim 1, wherein
generating a true borehole sigma by the pre-programmed non-transitory computer-readable memory device on an above-surface processing system, from the computed true borehole sigma further comprises the expression:

$$\Sigma_b = \frac{4.55 \times 10^3}{\tau_b}.$$

14. The method of claim 1,
generating a true formation sigma by the pre-programmed non-transitory computer-readable memory device on an above-surface processing system, from the computed true formation sigma further comprises the expression:

$$\Sigma_f = \frac{4.55 \times 10^3}{\tau_f}.$$

15. The method of claim 1, wherein
generating a neutron-induced borehole sigma by the pre-programmed non-transitory computer-readable memory device on an above-surface processing system, using the computed apparent borehole sigma and the computed apparent formation sigma of each of the at least three dual-function radiation detectors further comprises the expression:

$\Sigma_{bn}=g_1(\Sigma_{bnn},\Sigma_{fnn},\Sigma_{bnm},\Sigma_{fnm},\Sigma_{bnf},\Sigma_{fnf})$.

16. The method of claim 1, wherein
generating a neutron-induced formation sigma by the pre-programmed non-transitory computer-readable memory device on an above-surface processing system, using the computed apparent borehole sigma and the computed apparent formation sigma of each of the at least three dual-function radiation detectors further comprises the expression:

$\Sigma_{fn}=g_2(\Sigma_{bnn},\Sigma_{fnn},\Sigma_{bnm},\Sigma_{fnm},\Sigma_{bnf},\Sigma_{fnf})$.

17. The method of claim 1,
generating a gamma-induced borehole sigma by the pre-programmed non-transitory computer-readable memory device on an above-surface processing system, using the computed apparent borehole sigma and the computed apparent formation sigma of each of the at least three dual-function radiation detectors further comprises the expression:

$\Sigma_{bg}=g_3(\Sigma_{bgn},\Sigma_{fgn},\Sigma_{bgm},\Sigma_{fgm},\Sigma_{bgf},\Sigma_{fgf})$.

18. The method of claim 1, wherein
generating a gamma-induced formation sigma by the pre-programmed non-transitory computer-readable memory device on an above-surface processing system, sigma using the computed apparent borehole sigma and the computed apparent formation sigma of each of the at least three dual-function radiation detectors further comprises the expression:

$\Sigma_{fg}=g_4(\Sigma_{bgn},\Sigma_{fgn},\Sigma_{bgm},\Sigma_{fgm},\Sigma_{bgf},\Sigma_{fg,f})$.

19. The method of claim 1,
generating a true borehole sigma by the pre-programmed non-transitory computer-readable memory device on an above-surface processing system, using the generated neutron-induced borehole sigma with the generated gamma-induced borehole sigma further comprises the expression:

$\Sigma_b=g_5(\Sigma_{bn},\Sigma_{bg})$.

20. The method of claim 1, wherein
generating a true formation sigma by the pre-programmed non-transitory computer-readable memory device on an above-surface processing system, using the generated neutron-induced formation sigma with the generated gamma-induced formation sigma further comprises the expression:

$\Sigma_f=g_6(\Sigma_{fn},\Sigma_{fg})$.

21. A method for obtaining near-wellbore true borehole sigma and true formation sigma by using a nuclear logging tool during oil and gas exploration having a pulsed neutron source coupled with at least three dual-function radiation detectors, high-voltage suppliers and an electronic instrument having non-transitory computer readable memory device for performing the operations of processing, generating, and computing, the method comprising:
  initializing a wireline or logging-while-drilling system within a borehole in an earth formation having a nuclear logging tool for detecting and
  processing thermal neutrons and neutron-induced gamma rays comprising, a pulsed neutron source from a neutron generator operated at a neuron pulse of at least 500 Hz and a pulse width of at least 20 microseconds, at least three dual-function radiation detectors wherein each dual-function radiation detector is pre-programmed through a non-transitory computer-readable memory device using pulsed shape discrimination technique;
  capturing thermal neutrons and neutron-induced gamma rays, using the at least three dual-function radiation detectors;

processing the captured thermal neutrons and neutron-induced gamma rays, using the pre-programmed non-transitory computer-readable memory device for separating signals of thermal neutrons and neutron-induced gamma rays from each other;

pulsing the neutron source for at least two pulses;

generating two time-decay curves for each of the at least three dual-function radiation detectors by the pre-programmed non-transitory computer-readable memory device on an above-surface processing system, using the processed thermal neutrons and neutron-induced gamma rays immediately after the first pulse from the neutron source and before the second pulse from the neutron source, wherein said time-decay curves being one of thermal neutrons and one of neutron-induced thermal neutron capture gamma rays;

processing the generated time-decay curve of thermal neutrons by the pre-programmed non-transitory computer-readable memory device on an above-surface processing system, to obtain a neutron-induced borehole time-decay constant and a neutron-induced formation time-decay constant for each of the at least three dual-function radiation detectors;

generating an apparent borehole sigma, by the pre-programmed non-transitory computer-readable memory device on an above-surface processing system, using the processed time-decay curves of thermal neutrons for each of the at least three dual-function radiation detectors;

generating an apparent formation sigma, by the pre-programmed non-transitory computer-readable memory device on an above-surface processing system, using the processed time-decay curves of thermal neutrons rays for each of the at least three dual-function radiation detectors;

computing the generated apparent borehole sigma for each of the at least three dual-function radiation detectors with the generated apparent formation sigma for each of the at least three dual-function radiation detectors, using by the pre-programmed non-transitory computer-readable memory device on an above-surface processing system;

generating a neutron-induced borehole sigma by the pre-programmed non-transitory computer-readable memory device on an above-surface processing system, using the computed apparent borehole sigma and the computed apparent formation sigma of each of the at least three dual-function radiation detectors;

generating a neutron-induced formation sigma by the pre-programmed non-transitory computer-readable memory device on an above-surface processing system, using the computed apparent borehole sigma and the computed apparent formation sigma of each of the at least three dual-function radiation detectors;

processing the generated time-decay curve of neutron-induced thermal neutron capture gamma rays using the pre-programmed non-transitory computer-readable memory device on an above-surface processing system, to obtain a gamma-induced borehole sigma and a gamma-induced formation sigma for each of the at least three dual-function radiation detectors;

generating an apparent borehole sigma by the pre-programmed non-transitory computer-readable memory device on an above-surface processing system, using the processed time-decay curve of neutron-induced thermal neutron capture gamma rays for each of the at least three dual-function radiation detectors;

generating an apparent formation sigma by the pre-programmed non-transitory computer-readable memory device on an above-surface processing system, using the processed time-decay curve of neutron-induced thermal neutron capture gamma rays for each of the at least three dual-function radiation detectors;

computing the generated apparent borehole sigma for each of the at least three dual-function radiation detectors with the generated apparent formation sigma for each of the at least three dual-function radiation detectors, using by the pre-programmed non-transitory computer-readable memory device on an above-surface processing system;

generating a gamma-induced borehole sigma by the pre-programmed non-transitory computer-readable memory device on an above-surface processing system, using the computed apparent borehole sigma and the computed apparent formation sigma of each of the at least three dual-function radiation detectors;

generating a gamma-induced formation sigma by the pre-programmed non-transitory computer-readable memory device on an above-surface processing system, sigma using the computed apparent borehole sigma and the computed apparent formation sigma of each of the at least three dual-function radiation detectors;

processing the generated neutron-induced borehole sigma with the gamma-induced borehole sigma for each of the at least three dual-function radiation detectors, using the pre-programmed non-transitory computer-readable memory device on an above-surface processing system;

generating a true borehole sigma by the pre-programmed non-transitory computer-readable memory device on an above-surface processing system, using the generated neutron-induced borehole sigma with the generated gamma-induced borehole sigma;

processing the generated neutron-induced formation sigma with the gamma-induced formation sigma for each of the at least three dual-function radiation detectors, using the pre-programmed non-transitory computer-readable memory device; and generating a true formation sigma by the pre-programmed non-transitory computer-readable memory device on an above-surface processing system, using the generated neutron-induced formation sigma with the generated gamma-induced formation sigma.

\* \* \* \* \*